(12) United States Patent
Lohr et al.

(10) Patent No.: US 9,055,585 B2
(45) Date of Patent: Jun. 9, 2015

(54) POWER HEADROOM REPORTING FOR NON-SCHEDULED UPLINK COMPONENT CARRIERS

(75) Inventors: Joachim Lohr, Wiesbaden (DE); Hidetoshi Suzuki, Yokosuka (JP); Martin Feuersanger, Brenen (DE); Alexander Golitschek Edler von Elbwart, Darmstadt (DE); Takashi Iwai, Kanazawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 135 days.

(21) Appl. No.: 13/577,631

(22) PCT Filed: Feb. 10, 2011

(86) PCT No.: PCT/EP2011/000628
§ 371 (c)(1),
(2), (4) Date: Sep. 21, 2012

(87) PCT Pub. No.: WO2011/098275
PCT Pub. Date: Aug. 18, 2011

(65) Prior Publication Data
US 2013/0010720 A1    Jan. 10, 2013

(30) Foreign Application Priority Data

Feb. 12, 2010   (EP) .................................... 10153484
Sep. 17, 2010   (EP) .................................... 10177435

(51) Int. Cl.
*H04W 72/04*     (2009.01)
*H04L 1/00*      (2006.01)
(Continued)

(52) U.S. Cl.
CPC ......... *H04W 72/0453* (2013.01); *H04L 1/0026* (2013.01); *H04L 1/0038* (2013.01);
(Continued)

(58) Field of Classification Search
None
See application file for complete search history.

(56) References Cited

U.S. PATENT DOCUMENTS

2009/0257387 A1   10/2009   Gholmieh et al.
2010/0034176 A1   2/2010    Heo et al.
(Continued)

FOREIGN PATENT DOCUMENTS

CN    101340622 A    1/2009
CN    101631333 A    1/2010
(Continued)

OTHER PUBLICATIONS

Communication pursuant to Article 94(3) EPC dated Jun. 14, 2013 corresponding EP Application No. 11703612.9, 9 pages.
(Continued)

*Primary Examiner* — Donald Mills
(74) *Attorney, Agent, or Firm* — Seed IP Law Group PLLC

(57) ABSTRACT

This invention relates to a proposal for power headroom reporting for uplink component carriers for which no uplink resource allocation is scheduled by the eNodeB. The user equipment (UE) calculates a virtual power headroom for the non-scheduled uplink component carrier, based on a virtual uplink resource assignment pre-configured by the UE and eNodeB. According to one embodiment the maximum transmit power of the UE is set to a pre-configured fixed value. Alternatively, the maximum transmit power is calculated by the UE considering the power reduction, while the uplink transmission power is set to zero. The virtual power headroom is then transmitted to the eNodeB, which in turn can infer therefrom the pathloss and/or power-per-resource-block for the non-scheduled uplink component carrier and may also infer the power reduction used by the UE. This allows a more accurate scheduling of future uplink transmissions on said non-scheduled uplink component carrier.

20 Claims, 20 Drawing Sheets

(51) Int. Cl.
- *H04L 5/00* (2006.01)
- *H04W 52/14* (2009.01)
- *H04W 52/30* (2009.01)
- *H04W 52/34* (2009.01)
- *H04W 52/36* (2009.01)
- *H04W 24/08* (2009.01)
- *H04L 1/16* (2006.01)
- *H04L 25/03* (2006.01)
- *H04W 72/00* (2009.01)

(52) U.S. Cl.
CPC ............ *H04L 1/0046* (2013.01); *H04L 1/0061* (2013.01); *H04L 1/0072* (2013.01); *H04L 1/1657* (2013.01); *H04L 5/001* (2013.01); *H04L 5/0053* (2013.01); *H04L 5/0055* (2013.01); *H04L 5/0096* (2013.01); *H04L 5/0098* (2013.01); *H04L 25/03866* (2013.01); *H04W 52/146* (2013.01); *H04W 52/30* (2013.01); *H04W 52/343* (2013.01); *H04W 52/365* (2013.01); *H04W 72/00* (2013.01); *H04W 72/042* (2013.01); *H04W 52/34* (2013.01); *Y02B 60/50* (2013.01); *H04L 5/0048* (2013.01); *H04W 24/08* (2013.01)

(56) References Cited

U.S. PATENT DOCUMENTS

| | | | | |
|---|---|---|---|---|
| 2011/0105173 | A1* | 5/2011 | Haim et al. | 455/522 |
| 2011/0134774 | A1* | 6/2011 | Pelletier et al. | 370/252 |
| 2012/0224535 | A1* | 9/2012 | Kim et al. | 370/328 |
| 2012/0294213 | A1 | 11/2012 | Chen et al. | |

FOREIGN PATENT DOCUMENTS

| | | |
|---|---|---|
| EP | 2 317 815 A1 | 5/2011 |
| JP | 2013-513321 A | 4/2013 |

OTHER PUBLICATIONS

ZTE, "Parallel transmission of two types PHR," R2-103725, 3GPP TSG-RAN WG2 #70bis, Agenda item: 7.1.1.6, Stockholm Sweden, Jun. 28-Jul. 2, 2010, pp. 1-5.
New Postcom, "Design of PHR MAC CE format for CA," R2-104575, 3GPP TSG-RAN2#71, Agenda item:7.1.1.6, Madrid, Spain, Aug. 23-27, 2010, pp. 1-3.
"3rd Generation Partnership Project; Technical Specification Group Radio Access Network; Evolved Universal Terrestrial Radio Access (E-UTRA); User Equipment (UE) radio transmission and reception (Release 8)," Technical Specification, 3GPP TS 36.101 V8.7.0, Sep. 2009, 156 pages.
"3rd Generation Partnership Project; Technical Specification Group Radio Access Network; Evolved Universal Terrestrial Radio Access (E-UTRA); Requirements for support of radio resource management (Release 8)," Technical Specification, 3GPP TS 36.133 V8.7.0, Sep. 2009, 317 pages.
"3rd Generation Partnership Project; Technical Specification Group Radio Access Network; Evolved Universal Terrestrial Radio Access (E-UTRA); Physical Channels and Modulation (Release 8)," Technical Specification, 3GPP TS 36.211 V8.9.0, Dec. 2009, 83 pages.
"3rd Generation Partnership Project; Technical Specification Group Radio Access Network; Evolved Universal Terrestrial Radio Access (E-UTRA); Physical Channels and Modulation (Release 9)," Technical Specification, 3GPP TS 36.211 V9.0.0, Dec. 2009, 85 pages.
"3rd Generation Partnership Project; Technical Specification Group Radio Access Network; Evolved Universal Terrestrial Radio Access (E-UTRA); Multiplexing and channel coding (Release 8)," Technical Specification, 3GPP TS 36.212 V8.8.0, Dec. 2009, 60 pages.
"3rd Generation Partnership Project; Technical Specification Group Radio Access Network; Evolved Universal Terrestrial Radio Access (E-UTRA); Multiplexing and channel coding (Release 9)," Technical Specification, 3GPP TS 36.212 V9.0.0, Dec. 2009, 61 pages.
"3rd Generation Partnership Project; Technical Specification Group Radio Access Network; Evolved Universal Terrestrial Radio Access (E-UTRA); Physical layer procedures (Release 8)," Technical Specification, 3GPP TS 36.213 V8.8.0, Sep. 2009, 77 pages.
"3rd Generation Partnership Project; Technical Specification Group Radio Access Network; Evolved Universal Terrestrial Radio Access (E-UTRA) Medium Access Control (MAC) protocol specification (Release 8)," Technical Specification, 3GPP TS 36.321 V8.7.0, Sep. 2009, 47 pages.
Catt, "Considerations on uplink power control in LTE-Advanced," R1-100071, Agenda Item: 7.1.7, 3GPP TSG RAN WG1 meeting #59bis, Valencia, Spain, Jan. 18-22, 2010, 3 pages.
Ericsson, QUALCOMM Europe, "Text Proposal for DC-HSDPA assumptions and standards impact," R1-082249, Agenda Item: 10, 3GPP TSG-RAN WG1 Meeting #53, Kansas City, MO, USA, May 5-9, 2008, 18 pages.
European Search Report, dated Jul. 7, 2010, for corresponding European Application No. 10 15 3484 , 2 pages.
European Search Report, dated May 11, 2011, for corresponding European Application No. 10 17 7435, 3 pages.
International Search Report, dated May 18, 2011, for corresponding International Application No. PCT/EP2011/000628, 3 pages.
Nokia Siemens Networks, Nokia, "Uplink Power Control for LTE-Advanced," R1-100322, Agenda Item: 7.1.7, 3GPP TSG RAN WG1 #59bis Meeting, Valencia, Spain, Jan. 18-22, 2010, 8 pages.
Nokia Siemens Networks, Nokia Corporation, "Further consideration on virtual PHR," R2-104394, Agenda Item: 7.1.1.6, 3GPP TSG-RAN WG2 Meeting #71, Madrid, Spain, Aug. 23-27, 2010, 5 pages.
Panasonic, "virtual power headroom report," R2-104502, Agenda Item: 7.1.1.6, 3GPP TSG-RAN WG2 #71, Madrid, Spain, Aug. 23-27, 2010, 2 pages.
Potevio, "Uplink Power Control for Carrier Aggregation in LTE-Advanced," R1-100609, Agenda Item: 7.1.7, 3GPP TSG RAN WG1 Meeting #59bis, Valencia, Spain, Jan. 18-22, 2010, 3 pages.
Research in Motion UK Limited, "Remaining issues on Uplink Power Control for Carrier Aggregation," R1-100569, Agenda Item: 7.1.7, 3GPP TSG RAN WG1 Meeting #59bis, Valencia, Spain, Jan. 18-22, 2010, 4 pages.
Samsung, "PH calculation of non-transmitting CC," R2-104824, Agenda Item: 7.1.1.6, 3GPP TSG-RAN2#71 meeting, Madrid, Spain, Aug. 23-27, 2010, 3 pages.
ZTE, "PHR remain issue," R2-104629, Agenda Item: 7.1.1.6, 3GPP TSG-RAN WG2 #71, Madrid, Spain, Jul. 23-26, 2010, 4 pages.
Sesia et al., LTE—The UMTS Long Term Evolution—From Theory to Practice, John Wiley & Sons, Ltd., West Sussex, United Kingdom, 2009, Section 6, "Introduction to Downlink Physical Layer Design," pp. 135-140 and Section 9, "Downlink Physical Data and Control Channels," pp. 181-206. (35 pages).
Ericsson, ST-Ericsson, "Summary of the email discussion [68#23] LTE: CC activation/deactivation," Tdoc R2-100079, Agenda Item: 7.1.3, 3GPP TSG-RAN WG2 #68bis, Valencia, Spain, Jan. 18-22, 2010, 17 pages.
NEC Group, "PDCCH Structure for LTE-Advanced System," R1-091692, Agenda Item: 15.4, TSG-RAN WG1#57, San Francisco, CA, May 4-8, 2009, 8 pages.
Notice of Reasons for Rejection, mailed Aug. 26, 2014, for corresponding Japanese Application No. 2012-552296, 7 pages.
Notification of first Office Action dated Oct. 8, 2014, for corresponding CN Application No. 201180017607.5, 17 pages.

* cited by examiner

| Flag Format 0/1A | Hopping Flag | Resource Block Assignment | MCS & RV | NDI | TPC for PUSCH | Cyclic Shift DMRS | CQI request | padding bits to Format 1A |
|---|---|---|---|---|---|---|---|---|
| = 0 | 0/1 | 5 to 13 bits | 5 bits | 0/1 | 2 bits | 3 bits | 0/1 | |

Fig. 9

| CIF field | Flag Format 0/1A | Hopping Flag | Resource Block Assignment | MCS & RV | NDI | TPC for PUSCH | Cyclic Shift DMRS | CQI request | padding bits to Format 1A |
|---|---|---|---|---|---|---|---|---|---|
| 3 bits | = 0 | 0/1 | 5 to 13 bits | 5 bits | 0/1 | 2 bits | 3 bits | 0/1 | |

Fig. 10

| CIF field | Flag Format 0/1A | Hopping Flag | Resource Block Assignment | MCS & RV | DL CC (de)activation field | Cyclic Shift DMRS | padding bits to Format 1A |
|---|---|---|---|---|---|---|---|
| = 111 | = 0 | 0/1 | 5 to 13 bits | 5 bits | 4 bits | 3 bits | |

Fig. 13

| CIF field | Flag Format 0/1A | Hopping Flag | Resource Block Assignment | MCS & RV | NDI | TPC for PUSCH | Cyclic Shift DMRS | CQI request | padding bits to Format 1A |
|---|---|---|---|---|---|---|---|---|---|
| ≠ 111 | = 0 | 0/1 | 5 to 13 bits | 5 bits | 0/1 | 2 bits | 3 bits | 0/1 | |

| Flag Format 0/1A | Localized/Distributed VRB assignment flag | RBA | MCS | HARQ process number | NDI | RV | TPC for PUCCH |
|---|---|---|---|---|---|---|---|
| = 1 | 1 bit | 5 to 13 bits | 5 bits | 3 bits | 1 bit | 2 bits | 2 bits |

Fig. 18

| CIF | Flag Format 0/1A | Localized/Distributed VRB assignment flag | RBA | MCS | HARQ process number | NDI | RV | TPC for PUCCH |
|---|---|---|---|---|---|---|---|---|
| 3 bits | = 1 | 1 bit | 5 to 13 bits | 5 bits | 3 bits | 1 bit | 2 bits | 2 bits |

POWER HEADROOM REPORTING FOR NON-SCHEDULED UPLINK COMPONENT CARRIERS

FIELD OF THE INVENTION

This invention relates to the reporting of power headrooms for uplink component carriers which do not have an uplink resource assignment for the reference subframe. Furthermore, the invention relates to the use of the new power headroom reporting for a mobile terminal.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is to be finalized as Release 8 (LTE). The LTE system represents efficient packet-based radio access and radio access networks that provide full IP-based functionalities with low latency and low cost. The detailed system requirements are given in. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-Carrier Frequency Division Multiple Access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE (Release 8).

LTE Architecture

The overall architecture is shown in FIG. 1 and a more detailed representation of the E-UTRAN architecture is given in FIG. 2. The E-UTRAN consists of eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Medium Access Control (MAC) and MAC Control Elements

The MAC layer is the lowest sub-layer in the Layer 2 architecture of the LTE radio protocol stack (see 3GPP TS 36.321, "Medium Access Control (MAC) protocol specification", version 8.7.0, in particular sections 4.2, 4.3, 5.4.3 and 6, available at http//www.3gpp.org and incorporated in its entirety herein by reference). The connection to the physical layer below is through transport channels, and the connection to the RLC layer above is through logical channels. The MAC layer performs multiplexing and demultiplexing between logical channels and transport channels. The MAC layer in the transmitting side (in the following examples the user equipment) constructs MAC PDUs, also referred to as transport blocks, from MAC SDUs received through logical channels, and the MAC layer in the receiving side recovers MAC SDUs from MAC PDUs received through transport channels.

In the multiplexing and demultiplexing entity, data from several logical channels can be (de)multiplexed into/from one transport channel. The multiplexing entity generates MAC PDUs from MAC SDUs when radio resources are available for a new transmission. This process includes prioritizing the data from the logical channels to decide how much data and from which logical channel(s) should be included in each MAC PDU. Please note that the process of generating MAC PDUs in the user equipment is also referred to a logical channel prioritization (LCP) in the 3GPP terminology.

The demultiplexing entity reassembles the MAC SDUs from MAC PDUs and distributes them to the appropriate RLC entities. In addition, for peer-to-peer communication between the MAC layers, control messages called 'MAC Control Elements' can be included in the MAC PDU.

A MAC PDU primarily consists of the MAC header and the MAC payload (see 3GPP TS 36.321, section 6). The MAC header is further composed of MAC sub-headers, while the MAC payload is composed of MAC Control Elements, MAC SDUs and padding. Each MAC sub-header consists of a Logical Channel ID (LCID) and a Length (L) field. The LCID indicates whether the corresponding part of the MAC payload is a MAC Control Element, and if not, to which logical channel the related MAC SDU belongs. The L field indicates the size of the related MAC SDU or MAC Control Element. As already mentioned above, MAC Control Elements are used for MAC-level peer-to-peer signaling, including delivery of BSR information and reports of the UE's available power in the uplink, and in the downlink DRX commands and timing advance commands. For each type of MAC Control Element, one special LCID is allocated. An example for a MAC PDU is shown in FIG. 21.

Power Control

Uplink transmitter power control in a mobile communication system serves the purpose of balancing the need for sufficient transmitter energy per bit to achieve the required QoS against the need to minimize interference to other users of the system and to maximize the battery life of the user equipment. In achieving this, the uplink power control has to adapt to the characteristics of the radio propagation channel, including path loss, shadowing and fast fading, as well as overcoming interference from other users within the same cell and neighboring cells. The role of the Power Control (PC) becomes decisive to provide the required SINR (Signal-to-Interference plus Noise Ratio) while controlling at the same time the interference caused to neighboring cells. The idea of classic PC schemes in uplink is that all users are received with the same SINR, which is known as full compensation. As an alternative, the 3GPP has adopted the use of Fractional Power Control (FPC) for LTE Rel. 8/9. This new functionality makes users with a higher path-loss operate at a lower SINR requirement so that they will more likely generate less interference to neighboring cells.

The power control scheme provided in LTE Rel. 8/9 employs a combination of open-loop and closed-loop control. A mode of operation involves setting a coarse operating point for the transmission power density spectrum by open-loop means based on path-loss estimation. Faster operation can then be applied around the open-loop operating point by closed-loop power control. This controls interference and fine-tunes the power settings to suit the channel conditions including fast fading.

With this combination of mechanisms, the power control scheme in LTE Rel. 8/9 provides support for more than one mode of operation. It can be seen as a toolkit for different power control strategies depending on the deployment scenario, the system load and operator preference.

The detailed power control formulae are specified in LTE Rel. 8/9 for the Physical Uplink Shared Channel (PUSCH), Physical Uplink Control Channel (PUCCH) and the Sounding Reference Signals (SRS) in section 5.1 in 3GPP TS 36.213, "Physical layer procedures", version 8.8.0, available at http://www.3gpp.org and incorporated herein by reference. The formula for each of these uplink signals follows the same basic principles; in all cases they can be considered as a summation of two main terms: a basic open-loop operating point derived from static or semi-static parameters signaled by the eNodeB, and a dynamic offset updated from sub-frame to sub-frame.

The basic open-loop operating point for the transmit power per resource block depends on a number of factors including the inter-cell interference and cell load. It can be further broken down into two components, a semi-static base level $P_0$, further comprised of a common power level for all user equipments in the cell (measured in dBm) and a UE-specific offset, and an open-loop path-loss compensation component. The dynamic offset part of the power per resource block can also be further broken down into two components, a component dependent on the MCS and explicit Transmitter Power Control (TPC) commands.

The MCS-dependent component (referred to in the LTE specifications as $\Delta_{TF}$, where TF stands for "Transport Format") allows the transmitted power per resource block to be adapted according to the transmitted information data rate.

The other component of the dynamic offset is the UE-specific TPC commands. These can operate in two different modes: accumulative TPC commands (available for PUSCH, PUCCH and SRS) and absolute TPC commands (available for PUSCH only). For the PUSCH, the switch between these two modes is configured semi-statically for each UE by RRC signaling—i.e. the mode cannot be changed dynamically. With the accumulative TPC commands, each TPC command signals a power step relative to the previous level. Uplink transmitter power control in a mobile communication system serves the purpose of balancing the need for sufficient transmitter energy per bit to achieve the required QoS against the need to minimize interference to other users of the system and to maximize the battery life of the user equipment.

In achieving this, the uplink power control has to adapt to the characteristics of the radio propagation channel, including path loss, shadowing and fast fading, as well as overcoming interference from other users within the same cell and neighboring cells.

The setting of the UE Transmit power $P_{PUSCH}$ [dBm] for the PUSCH transmission in reference sub-frame i is defined by (see section 5.1.1.1 of 3GPP TS 36.213):

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \quad \text{Equation 1}$$

$P_{CMAX}$ is the maximum UE transmit power chosen by the UE in the given range (see below);

$M_{PUSCH}$ is the number of allocated physical resource blocks (PRBs). The more PRBs are allocated, the more uplink transmit power is allocated.

$P_{O\_PUSCH}(j)$ indicates the base transmission power signaled by RRC. For semi-persistent scheduling (SPS) and dynamic scheduling this is the sum of a cell specific nominal component $P_{O\_NOMINAL\_PUSCH}(j) \in [-126, \ldots, 24]$ and a UE specific component $P_{O\_UE\_PUSCH}(j) \in [-127, \ldots, -96]$. For RACH message 3: Offset from preamble transmission power α denotes a cell-specific parameter (that is broadcast on system information). This parameter indicates how much path-loss PL is compensated. α=1 means the received signal level at eNodeB is same regardless of the user equipment's position, i.e. near cell edge or at centre. If the path-loss is fully compensated, degradation to the cell-edge data rate is avoided. For SPS and dynamic scheduling α∈{0, 0.4, 0.5, 0.6, 0.7, 0.8, 0.9, 1}, and for the case of RACH Message 3, α(j)=1.

PL is the UE path-loss derived at the user equipments based on Reference Signal Received Power (RSRP) measurement and signaled Reference Signal (RS) transmission power. PL can be defined as PL=reference signal power−higher layer filtered RSRP.

$\Delta_{TF}$ is a modulation and coding scheme (transport format) dependent power offset. It thus allows the transmitted power per resource block to be adapted according to the transmitted information data rate.

f(i) is a function of the closed loop power control commands signaled from the eNodeB to the UE. f( ) represents accumulation in case of accumulative TPC commands. Whether closed loop commands are accumulative (each TPC command signals a power step relative to the previous level) or absolute (each TCP command is independent of the sequence of previous TPC commands) is configured by higher layers. For the accumulative TPC commands two sets of power step values are provided: (−1,1) dB for DCI format 3A and (−1,0+1,+3) dB for DCI format 3. The set of values which can be signaled by absolute TPC commands is (−4,−1,1,4) dB indicated by DCI format 3.

Power Headroom Reporting

In order to assist the eNodeB to schedule the uplink transmission resources to different user equipments in an appropriate way, it is important that the user equipment can report its available power headroom to eNodeB.

The eNodeB can use the power headroom reports to determine how much more uplink bandwidth per sub-frame a user equipment is capable of using. This helps to avoid allocating uplink transmission resources to user equipments which are unable to use them in order to avoid a waste of resources.

The range of the power headroom report is from +40 to −23 dB (see 3GPP TS 36.133, "Requirements for support of radio resource management", version 8.7.0, section 9.1.8.4, available at http//www.3gpp.org and incorporated in its entirety herein by reference). The negative part of the range enables the user equipment to signal to the eNodeB the extent to which it has received an UL grant which would require more transmission power than the UE has available. This would enable the eNodeB to reduce the size of a subsequent grant, thus freeing up transmission resources to allocate to other UEs.

A power headroom report can only be sent in sub-frames in which a UE has an UL transmission grant. The report relates to the sub-frame in which it is sent. The headroom report is therefore a prediction rather than a direct measurement; the UE cannot directly measure its actual transmission power headroom for the subframe in which the report is to be transmitted. It therefore relies on reasonably accurate calibration of the UE's power amplifier output.

A number of criteria are defined to trigger a power headroom report. These include:

A significant change in estimated path loss since the last power headroom report More than a configured time has elapsed since the previous power headroom report More than a configured number of closed-loop TPC commands have been implemented by the UE The eNodeB can configure parameters to control each of these triggers depending on the system loading and the requirements of its scheduling algorithm. To be more specific, RRC controls power headroom reporting by configuring the two timers periodicPHR-Timer and prohibitPHR-Timer, and by signalling dl-PathlossChange which sets the change in measured downlink pathloss to trigger a power headroom report.

The power headroom report is send as a MAC Control Element. It consists of a single octet where the two highest bits are reserved and the six lowest bits represent the 64 dB values mentioned above in 1 dB steps. The structure of the MAC Control Element is shown in FIG. 22.

The UE power headroom PH [dB] valid for sub-frame i is defined by (see section 5.1.1.2 of 3GPP TS 36.213):

$$PH(i) = P_{CMAX} - \{10 \cdot \log_{10}(M_{PUSCH}(i)) + P_{0\_PUSCH}(j) + \alpha(j) \cdot PL + \Delta_{TF}(i) + f(i)\} \quad \text{Equation 2}$$

The power headroom is rounded to the closest value in the range [40; −23] dB with steps of 1 dB. $P_{CMAX}$ is the total maximum UE transmit power (or total maximum transmit power of the user equipment) and is a value chosen by user equipment in the given range of $P_{CMAX\_L}$ and $P_{CMAX\_H}$ based on the following constraints:

$$P_{CMAX\_L} \leq P_{CMAX} \leq P_{CMAX\_H}$$

$$P_{CMAX\_L} = \min(P_{EMAX} - \Delta T_C, P_{PowerClass} - \text{MPR} - \text{AMPR} - \Delta T_C)$$

$$P_{CMAX\_H} = \min(P_{EMAX}, P_{PowerClass})$$

$P_{EMAX}$ is the value signaled by the network and $\Delta T_C$, MPR and AMPR (also denoted A-MPR—Additional Maximum Power Reduction) are specified in 3GPP TS 36.101, "Evolved Universal Terrestrial Radio Access (E-UTRA); User Equipment (UE) radio transmission and reception", version 8.7.0, section 6.2 available at http//www.3gpp.org and incorporated herein by reference.

MPR is a power reduction value, the so-called Maximum Power Reduction, used to control the Adjacent Channel Leakage Power Ratio (ACLR) associated with the various modulation schemes and the transmission bandwidth. An adjacent channel may be for example either another Evolved Universal Terrestrial Radio Access (E-UTRA) channel or an UTRA channel. The maximum allowed power reduction (MPR) is also defined in 3GPP TS 36.101. It is different depending on channel bandwidth and modulation scheme. The user equipment's reduction may be less than this maximum allowed power reduction (MPR) value. 3GPP specifies a MPR test which verifies that the maximum transmit power of a user equipment is greater than or equal to the nominal total maximum transmit power minus the MPR while still complying with the ACLR requirements The following Table 1 shows the Maximum Power Reduction for UE Power Class 3.

TABLE 1 maximum power reduction for UE power class 3

| | Channel bandwidth Transmission bandwidth configuration (resource blocks) | | | | | | |
|---|---|---|---|---|---|---|---|
| Modulation | 1.4 MHz | 3 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

For instance, in case of an allocation for a channel bandwidth of 10 MHz, when allocating more than 12 resource blocks and using QPSK modulation, the MPR applied by the user equipment should be smaller than or equal to 1 dB. The actual MPR applied by the user equipment depends on the implementation of the UE and is thus unknown to the eNB.

As indicated above, AMPR is the Additional Maximum Power Reduction. It is band specific and is applied when configured by the network. As can be seen from the explanations above, $P_{CMAX}$ is UE-implementation specific and hence not known by the eNodeB.

FIG. 23 shows exemplary scenarios for a UE transmission power status and corresponding power headroom. On the left hand side of FIG. 23, the user equipment is not power limited (positive PHR), whereas on the right hand side of FIG. 23 a negative power headroom is implying a power limitation of the user equipment. Please note that the $P_{CMAX\_L} \leq P_{CMAX} \leq \min(P_{EMAX}, P_{PowerClass})$ wherein the lower boundary $P_{CMAX\_L}$ is typically mainly dependent on the maximum power reduction MPR and the additional maximum power reduction AMPR, i.e. $P_{CMAX\_L} \cong P_{PowerClass} - MPR - AMPR$ Component Carrier Structure in LTE (Release 8)

The downlink component carrier of a 3GPP LTE (Release 8) is subdivided in the time-frequency domain in so-called sub-frames. In 3GPP LTE (Release 8) each sub-frame is divided into two downlink slots as shown in FIG. 3, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The OFDM symbols are thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

Layer 1/Layer 2 (L1/L2) Control Signaling

In order to inform the scheduled users about their allocation status, transport format and other data related information (e.g. HARQ information, transmit power control (TPC) commands), L1/L2 control signaling is transmitted on the downlink along with the data. L1/L2 control signaling is multiplexed with the downlink data in a sub-frame, assuming that the user allocation can change from sub-frame to sub-frame. It should be noted that user allocation might also be performed on a TTI (Transmission Time Interval) basis, where the TTI length is a multiple of the sub-frames. The TTI length may be fixed in a service area for all users, may be different for different users, or may even by dynamic for each user. Generally, the L1/2 control signaling needs only be transmitted once per TTI. The L1/L2 control signaling is transmitted on the Physical Downlink Control Channel (PDCCH). It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories.

Shared Control Information (SCI) Carrying Cat 1 Information

The shared control information part of the L1/L2 control signaling contains information related to the resource allocation (indication). The shared control information typically contains the following information:

A user identity indicating the user(s) that is/are allocated the resources.

RB allocation information for indicating the resources (Resource Blocks (RBs)) on which a user(s) is/are allocated. The number of allocated resource blocks can be dynamic.

The duration of assignment (optional), if an assignment over multiple sub-frames (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Downlink Control Information (DCI) Carrying Cat 2/3 Information

The downlink control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The downlink control information needs only to be decoded by the user scheduled according to Cat 1. The downlink control information typically contains information on:

Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks)

Cat 3 information: HARQ related information, e.g. hybrid ARQ process number, redundancy version, retransmission sequence number Downlink control information occurs in several formats that differ in overall size and also in the information contained in its fields. The different DCI formats that are currently defined for LTE Release 8/9 (3GPP LTE) are described in detail in 3GPP TS 36.212, "Multiplexing and channel coding (Release 9)", version 8.8.0 or 9.0.0, section 5.3.3.1 (available at http://www.3gpp.org and incorporated herein by reference).

Downlink & Uplink Data Transmission

Regarding downlink data transmission, L1/L2 control signaling is transmitted on a separate physical channel (PDCCH), along with the downlink packet data transmission. This L1/L2 control signaling typically contains information on:

The physical resource(s) on which the data is transmitted (e.g. subcarriers or subcarrier blocks in case of OFDM, codes in case of CDMA). This information allows the UE (receiver) to identify the resources on which the data is transmitted.

When user equipment is configured to have a Carrier Indication Field (CIF) in the L1/L2 control signaling this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e. the cross-scheduled component carrier does not carry any L1/L2 control signaling.

The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.

Hybrid ARQ (HARQ) information:
  HARQ process number: Allows the user equipment to identify the hybrid ARQ process on which the data is mapped.
  Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.
  Redundancy and/or constellation version: Tells the user equipment, which hybrid ARQ redundancy version is used (required for de-rate-matching) and/or which modulation constellation version is used (required for demodulation).
  UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:
  The physical resource(s) on which the user equipment should transmit the data (e.g. subcarriers or subcarrier blocks in case of OFDM, codes in case of CDMA).
  When user equipment is configured to have a Carrier Indication Field (CIF) in the L1/L2 control signaling this information identifies the component carrier for which the specific control signaling information is intended. This enables assignments to be sent on one component carrier which are intended for another component carrier. This other, cross-scheduled component carrier may be for example a PDCCH-less component carrier, i.e. the cross-scheduled component carrier does not carry any L1/L2 control signaling.
  L1/L2 control signaling for uplink grants is sent on the DL component carrier that is linked with the uplink component carrier or on one of the several DL component carriers, if several DL component carriers link to the same UL component carrier.
  The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.
  Hybrid ARQ information:
    HARQ Process number: Tells the user equipment from which hybrid ARQ process it should pick the data.
    Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.
    Redundancy and/or constellation version: Tells the user equipment, which hybrid ARQ redundancy version to use (required for rate-matching) and/or which modulation constellation version to use (required for modulation).
  UE Identity (UE ID): Tells which user equipment should transmit data. In typical implementations this information is used to mask the CRC of the L1/L2 control signaling in order to prevent other user equipments to read this information.

There are several different flavors how to exactly transmit the information pieces mentioned above in uplink and downlink data transmission. Moreover, in uplink and downlink, the L1/L2 control information may also contain additional information or may omit some of the information. For example:
  HARQ process number may not be needed, i.e. is not signaled, in case of a synchronous HARQ protocol.
  A redundancy and/or constellation version may not be needed, and thus not signaled, if Chase Combining is used (always the same redundancy and/or constellation version) or if the sequence of redundancy and/or constellation versions is pre-defined.
  Power control information may be additionally included in the control signaling.
  MIMO related control information, such as e.g. pre-coding, may be additionally included in the control signaling.
  In case of multi-codeword MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e. the RV info is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RV0. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

Physical Downlink Control Channel (PDCCH)

The physical downlink control channel (PDCCH) carries the L1/L2 control signaling, i.e. transmit power control commands and the scheduling grants for allocating resources for downlink or uplink data transmission. To be more precise, the downlink control channel information (i.e. the DCI contents, respectively, the L1/L2 control signaling information) is mapped to its corresponding physical channel, the PDCCH. This "mapping" includes the determination of a CRC attachment for the downlink control channel information, which is a CRC calculated on the downlink control channel information being masked with an RNTI, as will explained below in more detail. The downlink control channel information and its CRC attachment are then transmitted on the PDCCH (see 3GPP TS 36.212, sections 4.2 and 5.3.3).

Each scheduling grant is defined based on Control Channel Elements (CCEs). Each CCE corresponds to a set of Resource Elements (REs). In 3GPP LTE, one CCE consists of 9 Resource Element Groups (REGs), where one REG consists of four REs.

The PDCCH is transmitted on the first one to three OFDM symbols within a sub-frame. For a downlink grant on the physical downlink shared channel (PDSCH), the PDCCH assigns a PDSCH resource for (user) data within the same sub-frame. The PDCCH control channel region within a sub-frame consists of a set of CCE where the total number of CCEs in the control region of sub-frame is distributed throughout time and frequency control resource. Multiple CCEs can be combined to effectively reduce the coding rate of the control channel. CCEs are combined in a predetermined manner using a tree structure to achieve different coding rate.

In 3GPP LTE (Release 8/9), a PDCCH can aggregate 1, 2, 4 or 8 CCEs. The number of CCEs available for control channel assignment is a function of several factors, including carrier bandwidth, number of transmit antennas, number of OFDM symbols used for control and the CCE size, etc. Multiple PDCCHs can be transmitted in a sub-frame.

Downlink control channel information in form of DCI transports downlink or uplink scheduling information, requests for aperiodic Cal reports, or uplink power control commands for one RNTI (Radio Network Terminal Identifier). The RNTI is a unique identifier commonly used in 3GPP systems like 3GPP LTE (Release 8/9) for destining data or information to a specific user equipment. The RNTI is implicitly included in the PDCCH by masking a CRC calculated on the DCI with the RNTI—the result of this operation is the CRC attachment mentioned above. On the user equipment side, if decoding of the payload size of data is successful, the user equipment detects the DCI to be destined to the user equipment by checking whether the CRC on the decoded payload data using the "unmasked" CRC (i.e. after removing the masking using the RNTI) is successful. The masking of the CRC code is for example performed by scrambling the CRC with the RNTI.

In 3GPP LTE (Release 8) the following different DCI formats are defined:

Uplink DCI formats:
Format 0 used for transmission of UL SCH assignments
Format 3 is used for transmission of TPC commands for PUCCH and PUSCH with 2 bit power adjustments (multiple UEs are addressed)
Format 3A is used for transmission of TPC commands for PUCCH and PUCCH with single bit power adjustments (multiple UEs are addressed)

Downlink DCI formats:
Format 1 used for transmission of DL SCH assignments for SIMO operation
Format 1A used for compact transmission of DL SCH assignments for SIMO operation
Format 1B used to support closed loop single rank transmission with possibly contiguous resource allocation
Format 1C is for downlink transmission of paging, RACH response and dynamic BCCH scheduling
Format 1D is used for compact scheduling of one PDSCH codeword with precoding and power offset information
Format 2 is used for transmission of DL-SCH assignments for closed-loop MIMO operation
Format 2A is used for transmission of DL-SCH assignments for open-loop MIMO operation For further information on the LTE physical channel structure in downlink and the PDSCH and PDCCH format, see Stefania Sesia et al., "LTE—The UMTS Long Term Evolution", Wiley & Sons Ltd., ISBN 978-0-47069716-0, April 2009, sections 6 and 9.

Blind Decoding of PDCCHs at the User Equipment

In 3GPP LTE (Release 8/9), the user equipment attempts to detect the DCI within the PDCCH using so-called "blind decoding". This means that there is no associated control signaling that would indicate the CCE aggregation size or modulation and coding scheme for the PDCCHs signaled in the downlink, but the user equipment tests for all possible combinations of CCE aggregation sizes and modulation and coding schemes, and confirms that successful decoding of a PDCCH based on the RNTI. To further limit complexity a common and dedicated search space in the control signaling region of the LTE component carrier is defined in which the user equipment searches for PDCCHs.

In 3GPP LTE (Release 8/9) the PDCCH payload size is detected in one blind decoding attempt. The user equipment attempts to decode two different payload sizes for any configured transmission mode, as highlighted in Table 1 below. Table 1 shows that payload size X of DCI formats 0, 1A, 3, and 3A is identical irrespective of the transmission mode configuration. The payload size of the other DCI format depends on the transmission mode.

TABLE 1

| DCI Formats | | |
| --- | --- | --- |
| payload size X | payload size different from X | transmission mode |
| 0/1A/3/3A | 1C | broadcast/unicast/paging/power control |
| | 1 | Mode 1 | DL TX modes |
| | 1 | Mode 2 | |
| | 2A | Mode 3 | |
| | 2 | Mode 4 | |
| | 1B | Mode 5 | |
| | 1D | Mode 6 | |
| | 1 | Mode 7 | |
| | 1 | Mode 1 | SPS-Modes |
| | 1 | Mode 2 | |
| | 2A | Mode 3 | |
| | 2 | Mode 4 | |
| | 1 | Mode 7 | |

Accordingly, the user equipment can check in a first blind decoding attempt the payload size of the DCI. Furthermore, the user equipment is further configured to only search for a given subset of the DCI formats in order to avoid too high processing demands.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved in the 3GPP. The study item covers technology components to be considered for the evolution of E-UTRA, e.g. to fulfill the requirements on IMT-Advanced. Two major technology components which are currently under consideration for LTE-A are described in the following.

Carrier Aggregation in LTE-A for Support of Wider Bandwidth

In Carrier Aggregation (CA), two or more Component Carriers (CCs) are aggregated in order to support wider transmission bandwidths up to 100 MHz. All component carriers can be configured to be 3GPP LTE Release 8/9 compatible, at least when the aggregated numbers of component carriers in the uplink and the downlink are the same. This does not necessarily mean that all component carriers need to be compatible to 3GPP LTE (Release 8/9).

A user equipment may simultaneously receive or transmit on one or multiple component carriers. On how many component carriers simultaneous reception/transmission is possible, is depending on the capabilities of a user equipment.

A 3GPP LTE (Release 8/9) compatible user equipment can receive and transmit on a single CC only, provided that the structure of the CC follows the 3GPP LTE (Release 8/9) specifications, while a 3GPP LTE-A (Release 10) compatible user equipment with reception and/or transmission capabilities for carrier aggregation can simultaneously receive and/or transmit on multiple component carriers.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a UE with more uplink component carriers that downlink component carriers. In a typical TDD deployment, the number of component carriers and the bandwidth of each component carrier in uplink and downlink is the same. Component carriers originating from the same eNodeB need not to provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the user equipment only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected mode. Within the configured set of component carriers, other cells are referred to as Secondary Cells (SCells). The characteristics of the downlink and uplink PCell are:

- The uplink PCell is used for transmission of Layer 1 uplink control information
- The downlink PCell cannot be de-activated
- Re-establishment is triggered when the downlink PCell experiences Rayleigh fading (RLF), not when downlink SCells experience RLF
- The downlink PCell cell can change with handover
- Non-access stratum information is taken from the downlink PCelll.

The reconfiguration, addition and removal of component carriers can be performed by RRC. At intra-LTE handover, RRC can also add, remove, or reconfigure component carriers for usage in the target cell. When adding a new component carrier, dedicated RRC signalling is used for sending the system information of the component carrier, the information being necessary for component carrier transmission/reception (similarly as in Rel-8/9 for handover).

When a user equipment is configured with carrier aggregation there is one pair of uplink and downlink component carriers that is always activate. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats.

A linking between uplink and downlink component carriers allows identifying the uplink component carrier for which the grant applies when there is no-cross-carrier scheduling.

The linkage of downlink component carriers to uplink component carriers does not necessarily need to be one to one. In other words, more than one downlink component carrier can link to the same uplink component carrier. At the same time, a downlink component carrier can only link to one uplink component carrier. FIGS. 7 and 8 exemplarily show possible linkages between downlink and uplink component carriers. While in FIG. 7 all downlink component carriers are linked to the same uplink component carrier, in FIG. 8 downlink component carriers 1 and 2 are linked to uplink component carrier 1 and downlink component carrier 3 is linked to uplink component carrier 2.

DRX and Carrier Aggregation

In order to provide reasonable battery consumption of user equipment 3GPP LTE (Release 8/9) as well as 3GPP LTE-A (Release 10) provides a concept of discontinuous reception (DRX).

For this concept the following terms describe the user equipment's state in terms of DRX.
- on-duration: duration in downlink sub-frames that the user equipment waits for, after waking up from DRX, to receive PDCCHs. If the user equipment successfully decodes a PDCCH, the user equipment stays awake and starts the inactivity timer;
- inactivity-timer: duration in downlink sub-frames that the user equipment waits to successfully decode a PDCCH, from the last successful decoding of a PDCCH, failing which it re-enters DRX. The user equipment shall restart the inactivity timer following a single successful decoding of a PDCCH for a first transmission only (i.e. not for retransmissions).
- active-time: total duration that the user equipment is awake. This includes the "on-duration" of the DRX cycle, the time user equipment is performing continuous reception while the inactivity timer has not expired and the time user equipment is performing continuous reception while waiting for a downlink retransmission after one HARQ RTT (Round Trip Time). Based on the above the minimum active time is of length equal to on-duration, and the maximum is undefined (infinite);

There is only one DRX cycle per user equipment. All aggregated component carriers follow this DRX pattern, i.e. the same DRX operation applies to all configured and activated component carriers (e.g. identical active time for PDCCH monitoring). When in active time, any component carrier may always schedule PDSCH on any other configured and activated component carrier (further restrictions FFS).

In order to allow for further battery saving optimization when carrier aggregation is configured, a further step of activation/deactivation of component carriers for SCells is introduced. Essentially a downlink component carrier could be in one of the following three states: non-configured, configured but deactivated and active. When a downlink SCell is not active (i.e. configured but deactivated or not configured), the user equipment does not need to receive the corresponding PDCCH or PDSCH, nor is it required to perform CQI measurements. Conversely, when a downlink SCell is active, the user equipment shall receive PDSCH and PDCCH (if present), and is expected to be able to perform CQI measurements. After configuration of component carriers in order to have PDCCH and PDSCH reception on a downlink component as described above, the downlink component carrier needs to be transitioned from configured but deactivated to active state.

Other details of the activation/deactivation mechanism for secondary component carriers may be:
- Explicit activation of downlink SCells is done by MAC signaling
- Explicit deactivation of downlink SCells is done by MAC signaling
- Implicit activation of downlink SCells is also possible
- Downlink SCells can be activated and deactivated individually, and a single activation (deactivation command can activate/deactivate a subset of the configured downlink secondary SCells
- SCells added to the set of configured component carriers are initially "deactivated"

Uplink Power Control for Carrier Aggregation

Even though most details of the uplink power control algorithm for the carrier aggregation case are still open or under discussion in the 3GPP working groups, the general agreement is that LTE-A Rel. 10 supports component carrier specific uplink power control, i.e. there will be one independent power control loop for each uplink component carrier configured for the user equipment. Furthermore it was decided that power headroom should be reported per-component carrier. In case of power limitation, i.e. UE transmission power is exceeding the total maximum UE transmit power, the following power scaling is applied.

For power scaling, the PUCCH power should be prioritized and the remaining power may be used by PUSCH (i.e. PUSCH power is scaled down first, maybe to zero). Further, a PUSCH with uplink control information (UCI) is prioritized over PUSCH without UCI. Additionally, equal power scaling for PUSCH transmissions without UCI is considered.

As each component carrier can be assumed to have its own power control loop and each transport block on each component carrier is transmitted with a power individually set for the component carrier, power headroom reporting should be performed per component carrier. Since carrier aggregation can be seen as a multiplication of several LTE Rel. 8/9 (component) carriers, it can be assumed that also the power headroom reporting on the individual component carriers will reuse the LTE Rel. 8/9 power headroom reporting procedures.

Furthermore, in LTE Rel.10 within the scope of carrier aggregation there are two maximum power limits, a total maximum UE transmit power $P_{CNMAX}$ and a component carrier-specific maximum transmit power $P_{CMAC,c}$. 3GPP RAN4 working group already indicated that both (nominal) maximum transmit power per user equipment $P_{CNMAX}$ and the (nominal) maximum component carrier-specific transmit power $P_{CMAC,c}$ should be the same regardless of the number of carriers supported, in order not to affect the link budget of a carrier aggregation capable user equipment in the single carrier operation mode. RAN1 agreed that a power headroom report, which is reported per component carriers, accounts for the maximum power reduction (MPR); in other words, the power reduction applied by the user equipment is taken into account in the component carrier specific maximum transmission power $P_{cmax,c}$, where c denotes the component carrier.

Different to LTE Rel. 8/9, in LTE-A Rel. 10 the user equipment has also to cope with simultaneous PUSCH-PUCCH transmission, multi-cluster scheduling, and simultaneous transmission on multiple component carriers, which requires larger MPR values and also causes a larger variation of the applied MPR values compared to 3GPP Rel. 8/9.

It should be noted that the eNodeB does not have knowledge of the power reduction applied by the user equipment on each component carrier, since the actual power reduction depends on the type of allocation, the standardized MPR value and also on the user equipment implementation. Therefore eNodeB doesn't know the component carrier-specific maximum transmission power relative to which the user equipment calculates the power headroom. In LTE Rel. 8/9 for example the user equipment maximum transmit power $P_{CNMAX}$ can be within some certain range as described above ($P_{CMAX\_L} \leq P_{CMAX} \leq P_{CMAX\_H}$).

Due to the reduction of the component carrier-specific maximum transmission power $P_{CMAC,c}$, which is not known to eNodeB as explained above, the eNodeB cannot really know how close a user equipment is operating to its total maximum transmission power $P_{CNMAX}$. Therefore there might be situations where user equipment is exceeding the total user equipment maximum transmission power $P_{CNMAX}$ which would hence require power scaling. FIG. 24 shows an exemplary scenario where user equipment is power limited, i.e. applying power scaling on component carriers CC#1 and CC#2 configured in the uplink. Even though the user equipment is power limited, the component carrier-specific power headroom reports according to the LTE definitions indicate sufficiently large power headroom.

In general power scaling might be rather an exceptional case. Therefore, it may be advantageous to design the power headroom reporting procedure such that those power limit cases are reduced. For example as mentioned in the application European patent application 09013756.3) a UE specific power headroom report can be introduced in addition to the component carrier specific power headroom reports, e.g. UE specific power headroom report is reported together with the component carrier specific power headroom reports in order to provide eNB the full picture on UEs power status.

For user equipment power-saving purposes, it's crucial that additional component carriers can be de-activated and activated in an efficient and fast way. With bursty data-transmission, it is imperative that additional component carriers can be activated and de-activated quickly, such that both the gains of high bit-rates can be utilized, and battery preservation can be supported. As described before user equipments will not perform and report CQI measurements on configured but deactivated downlink component carriers but only radio resource management related measurements like RSRP (Reference Signal Received Power) and RSRQ (Reference Signal Received Quality) measurements. Hence when activating a downlink component carrier, it's important that eNodeB acquires quickly CQI information for the newly activated component carrier(s) in order to being able to select an appropriate MCS for efficient downlink scheduling. Without CQI information eNodeB doesn't have knowledge about user equipment's downlink channel state and might only select a rather conservative MCS for downlink data transmission which would in turn lead to some resource utilization inefficiency.

In order to acquire CQI information quickly, eNodeB can schedule an aperiodic CQI by means of an uplink scheduling grant. The aperiodic CQI would be transmitted on the physical uplink shared channel (PUSCH). Therefore in order to activate a configured downlink component carrier, eNodeB would need to issue essentially two grants (PDCCH) to the UE, one downlink PDCCH in order to convey the activation command of a downlink component carrier and one uplink PDCCH which schedules uplink resources for the transmission of the aperiodic CQI. Furthermore both PDCCH has to be sent respectively received in the same TTI in order to ensure, that user equipment measures and reports CQI information for the correct downlink component carrier, i.e. the downlink component carrier which will be activated.

The correct reception of the aperiodic CQI can serve as an acknowledgement for the downlink activation command, i.e. when aperiodic CQI has been received eNodeB assumes that user equipment has activated the downlink component carrier indicated in the downlink PDCCH.

As it becomes apparent, the main drawback of the above described component carrier activation method is, that two PDCCHs are required in order to activate a downlink component carrier. Furthermore due to the fact that the two PDCCHs need to be received/sent simultaneously, certain error cases may occur in the presence of PDCCH loss.

In case only the downlink "activation" PDCCH is lost, user equipment will not activate the downlink component carrier. However based on received CQI information eNB erroneously assumes downlink activation has succeeded. In the second error case when only the uplink PDCCH which requests the aperiodic CQI is lost, eNodeB doesn't acquire CQI and erroneously assumes that downlink activation has failed.

There are also problems associated with the power headroom reporting according to 3GPP LTE Rel. 8/9 specification. As already set out before, a power headroom report according to 3GPP LTE Rel. 8/9 specification can only be sent in subframes in which a UE has an uplink assignment for transmission on the PUSCH (transport block), since the power headroom indicates the difference between the nominal user equipment's maximum transmit power and the estimated power for the assigned uplink transmission on the PUSCH. When using component carrier aggregation, no power headroom reporting can be performed for a component carrier which is not scheduled, i.e. without uplink resource assignment in the respective subframe. This is due to the fact that if there is no PUCCH/PUSCH transmission, the component carrier specific maximum transmission power cannot be determined. There is obviously also no transmission format without uplink transmission, i.e. allocated resource blocks, MCS.

However, the eNodeB uses the power headroom reports for determining how much more uplink bandwidth per subframe a UE is capable of using. When the eNB decides to schedule an uplink transmission on said non-scheduled uplink component carrier, the eNB would need to roughly estimate the power situation of said uplink component carrier or blindly schedule future uplink transmissions on the component carrier, since there is no power headroom information for the unscheduled uplink component carrier. Naturally, this blind scheduling may be far from optimum and may thus lead to a waste of resources in the uplink.

SUMMARY OF THE INVENTION

One object of the invention is to overcome at least one of the described problems. Furthermore, it is another object of the invention to allow efficient scheduling of future transmissions on an uplink component carrier on which no uplink transmission is currently scheduled.

The present invention is mainly applicable to cases in which it is not possible to calculate a power headroom report according to LTE Rel-8/9 specification. As explained above, the power headroom for a particular component carrier may generally be defined as the maximum transmit power specific to the component carrier minus the uplink transmission power required for performing an uplink transmission according to an uplink resource assignment over the particular component carrier as a result of the uplink power control formula. Therefore, when there is no uplink resource assignment in a subframe for an uplink transmission and hence no uplink transmission, no power headroom can be calculated for this particular subframe. When using carrier aggregation in the communication system, user equipments may have several uplink component carriers configured, and one or more uplink component carriers may not be scheduled for an uplink transmission. The component carriers may be in an activated or configured-but-deactivated state.

Because there is no uplink transmission, no transmission power is applied by the user equipment, and the power headroom cannot be calculated by the user equipment for said particular non-scheduled uplink component carrier.

According to a first aspect of the invention, the user equipment should be enabled to calculate a virtual power headroom and to transmit same to the eNodeB for uplink component carriers which are not scheduled.

A corresponding uplink resource allocation is pre-configured which may then be used by the user equipment to calculate/estimate the power headroom, instead of the usual uplink grant assigned by the eNodeB. The user equipment may calculate the virtual power headroom as if an uplink transmission according to the pre-configured virtual uplink resource allocation would have been scheduled by the eNodeB in the subframe for which a power headroom should be calculated, also referred to as reference subframe.

The term "virtual" in connection with the terms "virtual power headroom" and "pre-configured virtual uplink resource assignment" refers to their not-standard character. The "pre-configured virtual uplink resource assignment" is virtual in the sense that the uplink resource allocation is not used as intended, i.e. to perform an uplink transmission, but is used instead only to calculate the power headroom. The uplink component carrier remains unscheduled, even having this pre-configured virtual uplink resource assignment. Correspondingly, the "virtual power headroom" does not reflect the difference between the maximum transmit power of the component carrier and a real uplink transmission performed on said non-scheduled uplink component carrier, but merely assumes an uplink transmission which actually does not take place.

After calculating the virtual power headroom, the user equipment transmits same to the eNodeB. It is assumed that the eNodeB knows the details of the pre-configured virtual uplink resource assignment, used for calculating the virtual power headroom. In said case, the eNodeB can deduce information regarding the power status on the unscheduled uplink component carrier and on the user equipment from the received virtual power headroom and from the virtual uplink resource assignment. What exactly the eNodeB is able to infer depends on the calculation of the virtual headroom and will be explained in greater detail below, and in particular in the detailed description.

According to a first alternative, the maximum transmit power of the component carrier, which is usually specific to and configured by the user equipment (and thus unknown to the eNodeB), is set to fixed value. In other words, the maximum transmit power is pre-configured and not set by the user equipment alone. As explained in the background section, there is an upper and lower limit for the maximum transmit power, $P_{cmax\_H}$ and $P_{cmax\_L}$. The pre-configured maximum transmit power may be set e.g. to the highest or lowest configurable maximum transmit power applicable to a component carrier. In any case, the eNodeB knows which pre-configured maximum transmit power is applied by the user equipment for calculating the virtual power headroom.

Advantageously, the highest possible maximum transmit power is pre-configured. $P_{cmax\_H}$ (=$\min(P_{EMAX}, P_{PowerClass})$) only depends on $P_{EMAX}$ and $P_{Powerclass}$ both already known to the eNodeB. Thus, in case $P_{cmax\_H}$ is pre-configured, the eNodeB already is aware of same, which is not entirely true for $P_{cmax\_L}$. More specifically, $P_{cmax\_L}$ (=$\min(P_{EMAX}-\Delta T_C, P_{PowerClass}-MPR-AMPR-\Delta T_C)$) further depends on the maximum power reduction which is actually configured by the user equipment and is unknown to the eNodeB. In said case, the eNodeB would be unaware of the exact pre-configured maximum transmit power applied by the user equipment in the calculation of the virtual power headroom. In order to avoid same, it can be accorded that the user equipment when using $P_{cmax\_L}$ as pre-configured maximum transmit power, uses the largest MPR value defined in the specification. The eNodeB thus may calculate the value of $P_{cmax\_L}$ itself.

Naturally, any other value for the pre-configured maximum transmit power may be accorded, as long as the eNodeB is aware of same.

It should be noted that the pre-configured maximum transmit power is only considered fix for calculating the virtual power headroom for a non-scheduled uplink component carrier. For calculating the power headroom reports for other scheduled uplink component carriers, the user equipment uses its own component carrier specific configured maximum transmit power.

The pre-configured virtual uplink resource assignment may define a particular number of resource blocks and a particular transport format. For example, the number of resource blocks is set to 1, and the offset value for the transport format $\Delta TF$ is set to zero dB. Consequently, the corresponding components, $10 \log_{10} M_{PUSCH}(i)$ and $\Delta TF$, in the formula for the power headroom can be ignored, which facilitates the calculation of same.

However, any values may be taken for the number of resource blocks and for the transport format offset $\Delta TF$ as long as the eNodeB is aware of these values.

After calculating the virtual power headroom as just described, the user equipment transmits same to the eNodeB. Since there is no actual uplink grant for the uplink component carrier for which the virtual power headroom has been calculated, the virtual power headroom may be sent on any other available uplink component carrier for which an uplink grant was assigned by the eNodeB.

The virtual power headroom of the non-scheduled uplink component carrier is thus reported to the eNodeB. When receiving the virtual power headroom, the eNodeB recognizes that it refers to the non-scheduled uplink component carrier. Furthermore, the eNodeB may calculate therefrom the power-per-resource-block and/or the path loss situation for this unscheduled uplink component carrier, since the eNodeB is aware of the corresponding parameters on which basis the user equipment has calculated the received virtual power headroom. This knowledge can be used by the eNodeB for a more efficient radio resource management.

According to a second alternative, the virtual power headroom is calculated such that it is equal to the maximum transmit power configured by the user equipment for the non-scheduled uplink component carrier. Put differently, the uplink transmission power for the non-scheduled uplink component carrier is set to zero dB; consequently, according to the formula for calculating a power headroom, the virtual power headroom is thus defined to be the maximum transmit power of the user equipment.

This differs from the first alternative, which assumes a pre-configured fixed value which is known to both the user equipment and the eNodeB. In the second alternative however, the maximum transmit power is determined by the user equipment as usual, i.e. considering the power reduction specific to the user equipment according to the corresponding formula.

The virtual power headroom, being the maximum transmit power of the respective uplink component carrier, is transmitted to the eNodeB, e.g. on another uplink component carrier which has an uplink grant.

The eNodeB receives the virtual power headroom, being the maximum transmit power of the component carrier, and can calculate therefrom the power reduction applied by the user equipment for the unscheduled uplink component carrier. In particular, the maximum transmit power is the $P_{cmax\_H}$=$\min(P_{EMAX}, P_{PowerClass})$ of the user equipment minus the power reduction applied by the user equipment for this uplink component carrier. The eNodeB knows the $P_{cmax\_H}$ and thus can calculate the power reduction applied by the user equipment for this component carrier.

Advantageously, the power reduction in the communications system considers transmissions on other uplink component carriers as well, and thus the same power reduction is applied to all uplink component carrier transmission. In said case, by calculating the power reduction based on the received virtual power headroom, the eNodeB learns the power reduction which is actually applied by the user equipment to all the other uplink component carriers. The eNodeB thus learns the absolute transmission power for the scheduled uplink component carriers and thus the total transmission power status of the UE, allowing a more accurate scheduling for future uplink transmissions.

The invention provides a method for reporting to an eNodeB a power headroom for a non-scheduled uplink component carrier of a user equipment in a mobile communication system using component carrier aggregation. The user equipment calculates a virtual power headroom for the non-scheduled uplink component carrier, based on a pre-configured virtual uplink resource assignment for said non-scheduled uplink component carrier. The pre-configured virtual uplink resource assignment is known to the eNodeB. The user equipment then transmits the calculated virtual power headroom to the eNodeB.

According to an advantageous embodiment of the invention, the virtual power headroom is calculated further based on a pre-configured maximum transmit power ($P_{cmax,c}$) for the non-scheduled uplink component carrier of the user equipment. This embodiment refers to first alternative discussed in the detailed description.

In a further embodiment of the invention, the eNodeB has information on the pre-configured virtual uplink resource assignment and on the pre-configured maximum transmit power for the non-scheduled uplink component carrier of the user equipment. Accordingly, the eNodeB determines the path-loss and/or power-per-resource-block for the non-scheduled uplink component carrier based on the received virtual power headroom and the pre-configured virtual uplink resource assignment and pre-configured maximum transmit power.

For another embodiment of the invention the eNodeB considers the determined path-loss and/or power-per-resource-block for the non-scheduled uplink component carrier when scheduling an uplink transmission for said uplink component carrier of the user equipment.

Referring to a further embodiment of the invention, the pre-configured maximum transmit power for the non-scheduled uplink component carrier is set to a highest ($P_{cmax\_H}$) or lowest ($P_{cmax\_L}$) configurable maximum transmit power for an uplink component carrier of the user equipment.

In a more detailed embodiment of the invention, wherein in case the pre-configured maximum transmit power is set to the lowest maximum transmit power, the user equipment uses a pre-determined power reduction for calculating the lowest maximum transmit power. The determining of the path-loss for the non-scheduled uplink component carrier includes calculating the lowest maximum transmit power for an uplink component carrier of the user equipment based on the pre-determined power reduction.

According to an alternative embodiment of the invention, the virtual power headroom is equal to the maximum transmit power ($P_{cmax,c}$) configured by the user equipment for the non-scheduled uplink component carrier. This refers to the second embodiment discussed in the detailed description, which also discloses that the uplink transmission power for the non-scheduled uplink component carrier is defined to be zero for the calculation of the virtual power headroom.

For another embodiment of the invention the calculation of a power reduction for each uplink component carrier considers transmission(s) on other configured uplink component carrier(s) of the user equipment. In said case the user equipment determines a power reduction (MPR) for the non-scheduled uplink component carrier, which considers transmission(s) on other configured uplink component carrier(s) of the user equipment. The user equipment calculates the maximum transmit power based on the determined power reduction (MPR). In turn, the eNodeB calculates the power reduction used by the user equipment for all of its uplink component carriers, based on the received virtual power headroom.

For another embodiment of the invention the non-scheduled component carrier is in an activated or configured-but-deactivated state.

According to a further embodiment of the invention, the pre-configured uplink resource assignment is not used by the user equipment to perform an uplink transmission on the non-scheduled uplink component carrier. That's the reason why it is called "virtual".

In an advantageous embodiment of the invention, the virtual power headroom is transmitted to the eNodeB using another uplink component carrier having an uplink resource assignment scheduled by the eNodeB.

For another embodiment of the invention the virtual power headroom is identified by the eNodeB to refer to the non-scheduled uplink component carrier based on either a flag in a MAC, medium access control, control element, or a flag in the subheader of the MAC protocol data unit, comprising the virtual power headroom.

A different aspect of the invention relates to virtual power headroom taking values from 0 to 63, or to the virtual power headroom being calculated using an offset value.

The present invention also provides a user equipment for reporting to an eNodeB a power headroom for a non-scheduled uplink component carrier of the user equipment in a mobile communication system using component carrier aggregation. A processor of the user equipment calculates a virtual power headroom for the non-scheduled uplink component carrier, based on a pre-configured virtual uplink resource assignment for said non-scheduled uplink component carrier. The pre-configured virtual uplink resource assignment is known to the eNodeB. A transmitter of the user equipment transmits the calculated virtual power headroom to the eNodeB.

According to another embodiment, the processor calculates the virtual power headroom further based on a pre-configured maximum transmit power ($P_{cmax,c}$) for the non-scheduled uplink component carrier of the user equipment.

With regard to a further embodiment of the invention, the pre-configured maximum transmit power for the non-scheduled uplink component carrier is set to a highest ($P_{cmax\_H}$) or lowest ($P_{cmax\_L}$) configurable maximum transmit power for an uplink component carrier of the user equipment, and in case the pre-configured maximum transmit power is set to the lowest maximum transmit power, the processor uses a pre-determined power reduction for calculating the lowest maximum transmit power.

In an advantageous embodiment of the invention the processor calculates the virtual power headroom equal to the maximum transmit power ($P_{cmax,c}$) configured by the user equipment for the non-scheduled uplink component carrier.

For another embodiment of the invention, the processor considers transmission(s) on other configured uplink component carrier(s) of the user equipment, for calculating a power reduction for each uplink component carrier. The processor further determines a power reduction (MPR) for the non-scheduled uplink component carrier, which considers transmission(s) on other configured uplink component carrier(s) of the user equipment. The processor calculates the maximum transmit power based on the determined power reduction (MPR).

According to a further embodiment of the invention, the processor ignores the pre-configured uplink resource assignment for perform an uplink transmission on the non-scheduled uplink component carrier.

Referring to another embodiment of the invention, the transmitter transmits the virtual power headroom to the eNodeB using another uplink component carrier having an uplink resource assignment scheduled by the eNodeB.

For another embodiment of the invention the processor calculates the virtual power headroom under consideration of an offset value.

The present invention also provides a MAC control element for transmission from a user equipment to an eNodeB in a mobile communication system using component carrier aggregation. The MAC control element comprises a power headroom type bit for identifying a virtual headroom report. The virtual power headroom is calculated by the user equipment for a non-scheduled uplink component carrier in a mobile communication system using component carrier aggregation. The MAC control element then also comprises a power headroom value.

A further objection of the invention is to enable efficient and robust (de)activation of component carriers, while minimizing the signaling overhead.

The object is solved by the subject matter of the independent claims. Advantageous embodiments of the invention are subject to the dependent claims.

A first aspect of the invention is the proposal of a new uplink resource assignment format and a new downlink resource assignment format that allow the activation/deactivation of individual downlink component carriers configured for a mobile terminal (referred to as user equipment in the 3GPP terminology). The new uplink or downlink resource assignment comprises an indication of the activation state of the configured downlink component carriers, i.e. indicate which downlink component carrier(s) is/are to be activated or deactivated. This indication is for example implemented by means of a bit-mask that indicates which of the configured uplink component carriers are to be activated respectively deactivated.

Furthermore, as to the proposal of the new downlink resource assignment format, a single downlink resource assignment can be used to (de)activate downlink component carrier(s) and to simultaneously assign downlink resources on an activated downlink component carrier (i.e. a downlink component carrier already in active state at the time of receiving the downlink resource assignment).

In one exemplary implementation of the format in a 3GPP based communication system using carrier aggregation in the downlink, such as 3GPP LTE-A (Release 10) or future releases using carrier aggregation in the downlink, the new resource assignment format may be considered an extension to existing DCI formats or a new DCI format.

In another exemplary implementation, each of the bits in the bit-mask is associated to a respective configured downlink component carrier, and indicates its activation state. By checking this bit-mask comprised in the uplink or downlink resource assignment, the mobile terminal can determine for each of the configured downlink component carriers, whether the activation state of the respective downlink component carrier is changed, i.e. which one or ones of the configured downlink component carriers need to be activated or deactivated.

Furthermore, in a more advanced exemplary implementation, the uplink resource assignment including the component carrier activation/deactivation information may also instruct the mobile terminal to send a channel quality measurement on the newly activated component carriers (i.e. those component carrier(s) for which the state has changed from deactivated to activated). Accordingly, the mobile terminal performs a channel quality measurement for each newly activated component carrier and sends the result of the measurement to the base station (referred to as eNodeB in the 3GPP terminology) on the uplink resources that have been assigned to the mobile terminal by means of the uplink resource assignment. The transmission of the channel quality measurement result(s) indicates to the base station that the mobile terminal has successfully received the uplink resource assignment, respectively, has successfully activated/deactivated the configured downlink component carriers. Hence, the transmission of the channel quality measurement result(s) can be considered an acknowledgment of the uplink resource assignment, respectively the activation/deactivation of configured downlink component carriers by the mobile terminal.

In one embodiment of the invention, the new format of the uplink resource assignment is used in a method for (de)activating downlink component carriers in a mobile communication system using component carrier aggregation. In this method performed by a mobile terminal, the mobile terminal receives on a downlink component carrier, an uplink resource assignment for assigning uplink resources to the mobile terminal. The uplink resource assignment comprises a bit-mask indicating which of plural configured downlink component carriers are to be activated, respectively deactivated. The mobile terminal activates or deactivates the configured downlink component carriers according to the bit-mask comprised in the uplink resource assignment.

In a further embodiment of the invention, the mobile terminal performs a channel quality measurement for each downlink component carrier newly activated by the uplink resource assignment (i.e. the downlink component carrier(s) that is/are not yet activated at the time of receiving the uplink resource assignment), and transmits the channel quality measurement(s) for the activated downlink component carrier(s) on assigned uplink resources. Alternatively, according to another embodiment of the invention, the mobile terminal may also transmit scheduling-related information for uplink scheduling on the assigned uplink resources.

In both cases, the uplink transmission on the assigned uplink resource may be considered and acknowledgement of the (successful) reception of the uplink resource assignment or successful (de)activation of the downlink component carriers.

In another exemplary embodiment, the new uplink resource assignment format is used in another method for (de)activating downlink component carriers in a mobile communication system using component carrier aggregation that is performed by a base station, the base station transmits an uplink resource assignment to a mobile terminal for assigning uplink resources to a mobile terminal. The uplink resource assignment is transmitted on an active configured downlink component carrier to the mobile terminal. Moreover, besides the uplink assignment to the mobile terminal, the uplink resource assignment comprises a bit-mask indicating which of plural configured downlink component carriers are to be activated, respectively deactivated. In response to his uplink resource assignment, the base station receives an acknowledgment for the successful reception of the uplink resource assignment or successful (de)activation of the downlink component carriers. The acknowledgment is transmitted on the assigned uplink resources. Furthermore, the acknowledgement is for example received in form of a channel quality measurement(s) for newly activated downlink component carrier(s) or alternatively in form of scheduling related information transmitted from the mobile terminal to the base station.

In another embodiment of the invention, the new format of the downlink resource assignment is used in a method for (de)activating downlink component carriers in a mobile communication system using component carrier aggregation. In this method performed by a mobile terminal, the mobile terminal receives on a downlink component carrier, a downlink resource assignment for assigning downlink resources to the mobile terminal. The downlink resource assignment comprises an indication that indicating which of plural configured downlink component carriers are to be activated, respectively deactivated. The mobile terminal activates or deactivates the configured downlink component carriers according to the indication comprised in the uplink resource assignment. The indication may be for example realized in form of a bit-mask.

Furthermore, the mobile terminal further receives the downlink data indicated in the downlink resource assignment. Please note that the assigned downlink resources are on a downlink component carrier already in active state at the time of receiving the downlink resource assignment—which could be the downlink component carrier on which the downlink resource assignment has been received or a cross-scheduled other downlink component carrier in active state.

Moreover, in a further exemplary embodiment of the invention, the downlink resource assignment and the downlink data on the assigned downlink resources are received within a single sub-frame.

In the methods described above, according to another embodiment of the invention, the uplink resource assignment comprises a CRC field that is masked with a radio network temporary identifier (RNTI) assigned to the mobile terminal for the activation and deactivation of downlink component carriers. The use of a "special" RNTI assigned to the mobile terminal for the activation and deactivation of downlink component carriers the base station may for example indicate the format of the received uplink resource assignment to the mobile terminal. The special RNTI for the activation and deactivation of downlink component carriers is advantageously mobile terminal specific, so that no further indication of the intended receiver of the uplink or downlink resource assignment is needed.

As mentioned above, in the context of implementing the concepts of this invention in a 3GPP based communication system using carrier aggregation in the downlink, the uplink resource assignment as well as the downlink resource assignment proposed herein can be considered a "special" DCI format of L1/L2 control information. As plural DCI formats may exist that have the same size, the RNTI assigned to the mobile terminal for the activation and deactivation of downlink component carriers may be a format indication to distinguish the combined uplink assignment including information on the downlink component carrier activation state from "pure" resource assignments on an uplink, respectively downlink component carrier.

Staying for exemplary purposes at the exemplary implementation of the concepts of the invention in the 3GPP context, the uplink resource assignment could be for example reusing the 3GPP LTE (Release 8/9) DCI format 0, wherein the bits of new data indicator (NDI), the TPC command field and the CQI request flag of 3GPP LTE DCI format 0 are reused to indicate the bit-mask. Alternatively, in another exemplary implementation and in order to further include and an indication whether the mobile terminal is to send channel quality measurement for the newly activated downlink component carrier(s) to the uplink resource assignment, the bits of new data indicator (NDI), the TPC command field, the CQI request flag and one bit of the modulation and coding scheme field of 3GPP LTE DCI format 0 may be reused to indicate the bit-mask and the indication whether the mobile terminal is to send channel quality measurement for the newly activated downlink component carrier(s).

In a further embodiment of the invention, and still in the context of implementing the concepts of the invention in a 3GPP based communication system using carrier aggregation in the downlink, the uplink resource assignment is considered downlink control information (DCI) for FDD operation and consists of:
  a format flag for distinguishing DCI formats, which are defined to have the same number of bits/size,
  a hopping flag indicating whether or not the mobile terminal should employ uplink resource hopping,
  a resource block assignment field assigning the uplink resources on the PUSCH to the mobile terminal,
  a modulation and coding scheme field that is indicating the modulation scheme, coding rate and the redundancy version for the transmission on the assigned resources on the PUSCH,
  a DMRS field for configuring the cyclic shift applied to the reference symbol sequence,
  a component carrier (de)activation field that is indicating for each of a plurality of downlink component carriers, whether the respective downlink component carrier is to be activated or deactivated by means of the bit-mask, and
  if required (i.e. optionally) one or more padding bit(s) to align the size of the dedicated control information to a predetermined number of bits.

In another alternative embodiment of the invention, the uplink resource assignment further—i.e. in addition to the fields mentioned above—consists of a carrier indicator field for indicating on which of plural uplink component carriers the uplink resources are assigned. This implementation may be useful in a 3GPP LTE-A (Release 10) where cross-carrier scheduling can be employed.

In both exemplary uplink assignment formats discussed in the preceding paragraphs, the uplink resource assignment may optionally further consists of a CQI flag for indicating whether the mobile terminal is to send channel quality measurement for the newly activated downlink component carrier(s). Please note that this CQI flag is not necessarily the CQI flag as known from the 3GPP LTE (Release 8/9) DCI format 0. In an alternative implementation, the two uplink resource assignment formats discussed in the preceding paragraphs may optionally make use of at least one codepoint representable in the modulation and coding scheme field to indicate whether the mobile terminal is to send channel quality measurement for the newly activated downlink component carrier(s).

In another exemplary embodiment related to the implementation of the proposed downlink assignment in the 3GPP context, the downlink resource assignment could be for example reusing the 3GPP LTE (Release 8/9) DCI format 1A. For example, the bit(s) of new data indicator (NDI) and/or the TPC command for PUCCH field of 3GPP LTE DCI format 1A may be reused to indicate the activation state of the downlink component carriers. For example, if redefining the NDI flag as a new downlink component carrier (DL CC) (de) activation flag, this new flag could be used to activate or deactivate all downlink component carriers (except for one of the downlink component carriers, e.g. the anchor carrier, that is always activated). If the TPC command for PUCCH field and the NDI flag are reused, it would be possible to indicate by using one bit the activation state (active or configured but deactivated) for one component carrier, and to use the remaining available bits for indicating the one downlink component carrier to which the (de)activation pertains.

In a further embodiment of the invention, the uplink, respectively downlink resource assignment comprises a CRC field that is masked with a radio network temporary identifier (RNTI) assigned to the mobile terminal for resource assignments to the mobile terminal, and at least one of the codepoints of a carrier indicator field (CIF) of the uplink, respectively downlink resource assignment is indicating whether the uplink, respectively downlink resource assignment is indicating the bit-mask for (de)activating the configured downlink component carriers, or whether the uplink resource assignment is not used for (de)activation of the configured downlink component carriers, respectively only assigns uplink, respectively downlink resources.

A further aspect of the invention is the implementation of the different methods for (de)activating downlink component carriers in a mobile communication system using component carrier aggregation according to the various embodiments discussed herein in hardware and software, or combinations thereof. In this context, another embodiment of the invention provides a mobile terminal for use in a mobile communication system using component carrier aggregation. The mobile terminal comprises a receiver for receiving on a downlink component carrier, an uplink resource assignment for assigning uplink resources to the mobile terminal, wherein the uplink resource assignment is comprising a bit-mask indicating which of plural configured downlink component carriers are to be activated, respectively deactivated. Furthermore, the mobile terminal comprises a processor for activating or deactivating the configured downlink component carriers according to the bit-mask comprised in the uplink resource assignment.

In a furthermore embodiment of the invention, the mobile terminal also comprises a channel quality measuring unit for performing a channel quality measurement for each downlink component carrier newly activated by the uplink resource assignment, and a transmitter for transmitting the channel quality measurement(s) for the activated downlink component carrier(s) on assigned uplink resources.

Another embodiment of the invention provides a further mobile terminal for use in a mobile communication system using component carrier aggregation. The mobile terminal comprises a receiver for receiving on a downlink component carrier, an downlink resource assignment for assigning downlink resources to the mobile terminal, wherein the uplink resource assignment is comprising a bit-mask indicating which of plural configured downlink component carriers are to be activated, respectively deactivated. The receiver of the mobile terminal further receives the downlink data on the downlink resources assigned by the downlink resource assignment. Furthermore, the mobile terminal comprises a processor for activating or deactivating the configured downlink component carriers according to the bit-mask comprised in the uplink resource assignment.

In another embodiment of the invention, the mobile terminal receives the downlink data using one of plural HARQ processes of a HARQ protocol, and assumes a known value for the new data indicator (NDI) for the transmission of the downlink data.

According to another embodiment of the invention the uplink, respectively downlink resource assignment is received within a control signaling region of a sub-frame. Accordingly, the mobile terminal (or more accurately its receiver) may perform a blind detection of the resource assignment within the control signaling region of the sub-frame.

In a further embodiment of the invention, the mobile terminal's processor further obtains a masked CRC code from a CRC field of the uplink, respectively downlink resource assignment, de-masks the masked CRC code with a radio network temporary identifier (RNTI) assigned to the mobile terminal for the activation and deactivation of downlink component carriers to thereby obtain a CRC code, and verifies successful blind detection of the resource assignment based on the CRC code.

Furthermore, another embodiment of the invention provides a base station for in a mobile communication system using component carrier aggregation. The base station comprises a transmitter for transmitting on an active configured downlink component carrier an uplink resource assignment to a mobile terminal for assigning uplink resources to a mobile terminal, wherein the uplink resource assignment is comprising a bit-mask indicating which of plural configured downlink component carriers are to be activated, respectively deactivated. Moreover, the base station comprises a receiver for receiving on the assigned uplink resources an acknowledgment for the successful reception of the uplink resource assignment or successful (de)activation of the downlink component carriers, wherein the acknowledgement is received in form of a channel quality measurement(s) for the newly activated downlink component carrier(s).

With respect to the assignment of downlink resources, a further embodiment of the invention provides a base station for in a mobile communication system using component carrier aggregation. The base station comprises a transmitter for transmitting on an active configured downlink component carrier a downlink resource assignment to a mobile terminal for assigning downlink resources to a mobile terminal, wherein the downlink resource assignment is comprising a bit-mask indicating which of plural configured downlink component carriers are to be activated, respectively deactivated. Moreover, the base station further transmits within the same sub-frame as the downlink resource assignment and on the assigned downlink resources downlink data (e.g. a transport block) to the mobile terminal.

In another embodiment of the invention, the base station uses one of plural HARQ processes of a HARQ protocol for the transmission of the downlink data, and assumes a known value for the new data indicator (NDI) for the transmission of the downlink data.

The base station according to a more specific embodiment of the invention further comprises a processor for generating a CRC field for the uplink, respectively downlink resource assignment and for masking the CRC field with a radio network temporary identifier (RNTI) assigned to the mobile terminal for the activation and deactivation of downlink component carriers prior to the transmission of the uplink, respectively downlink resource assignment to the mobile terminal.

Moreover, the base station's transmitter may transmit the radio network temporary identifier (RNTI) assigned to the mobile terminal for the activation and deactivation of downlink component carriers to the mobile terminal.

As mentioned above, an aspect of the invention is the implementation of the methods for (de)activating downlink component carriers in a mobile communication system using component carrier aggregation according to the various embodiments discussed herein in software and its storage on computer-readable storage media.

According to a further embodiment, the invention provides a computer-readable medium that stores instructions that, when executed by a processor of a mobile terminal, cause the mobile terminal to perform one of methods for (de)activating downlink component carriers in a mobile communication system using component carrier aggregation according to one of the various embodiments discussed herein. The execution of the instructions may for example cause the mobile terminal to receive on a downlink component carrier, an resource assignment for assigning uplink or downlink resources to the mobile terminal, wherein the resource assignment is indicating which of plural configured downlink component carriers are to be activated, respectively deactivated, and further to activate or deactivate the configured downlink component carriers according to the bit-mask comprised in the uplink resource assignment.

Another embodiment of the invention is providing a computer-readable medium that stores instructions that, when executed by a processor of base station, cause the base station to perform one of methods for (de)activating downlink component carriers in a mobile communication system using component carrier aggregation according to one of the various embodiments discussed herein. The execution of the instructions may for example cause the base station to transmit on an active configured downlink component carrier an uplink resource assignment to a mobile terminal for assigning uplink resources to a mobile terminal, wherein the uplink resource assignment is comprising a bit-mask indicating which of plural configured downlink component carriers are to be activated, respectively deactivated, and to receive on the assigned uplink resources an acknowledgment for the successful reception of the uplink resource assignment or successful (de)activation of the downlink component carriers, wherein the acknowledgement is received in form of a channel quality measurement(s) for newly activated downlink component carrier(s).

A further embodiment of the invention is providing a computer-readable medium that stores instructions that, when executed by a processor of base station, cause the base station to transmit on an active configured downlink component carrier a downlink resource assignment to a mobile terminal for assigning downlink resources to the mobile terminal, wherein the uplink resource assignment is indicating which of plural configured downlink component carriers are to be activated, respectively deactivated. The instructions further cause the base station to transmit downlink data to the mobile terminal on the assigned downlink resources and within the same sub-frame in which the downlink resource assignment is transmitted.

BRIEF DESCRIPTION OF THE FIGURES

In the following the invention is described in more detail in reference to the attached figures and drawings. Similar or corresponding details in the figures are marked with the same reference numerals.

FIGS. 9 & 10 shows the contents of DCI format 0 in 3GPP LTE (Release 8/9), respectively 3GPP LTE-A (Release 10) without and with CIF field for cross-carrier scheduling, respectively, FIGS. 13 & 14 show a further exemplary improved DCI format 0 for (de)activating configured downlink component carriers for use in 3GPP LTE-A (Release 10) and according to an exemplary embodiment of the invention, where the interpretation of the content of the DCI format is depending on the codepoint of the CIF field, and FIG. 15 exemplifies the procedure for the (de)activation of downlink component carriers in an exemplary 3GPP-based communication system according to an embodiment of the invention, FIG. 16 exemplifies another procedure for the (de)activation of downlink component carriers in an exemplary 3GPP-based communication system according to an embodiment of the invention, including PHR reporting and SRS signal activation, FIGS. 17 & 18 shows the contents of DCI format 1 in 3GPP LTE (Release 8/9), respectively 3GPP LTE-A (Release 10) without and with CIF field for cross-carrier scheduling, respectively.

DETAILED DESCRIPTION OF THE INVENTION

Figure 1:
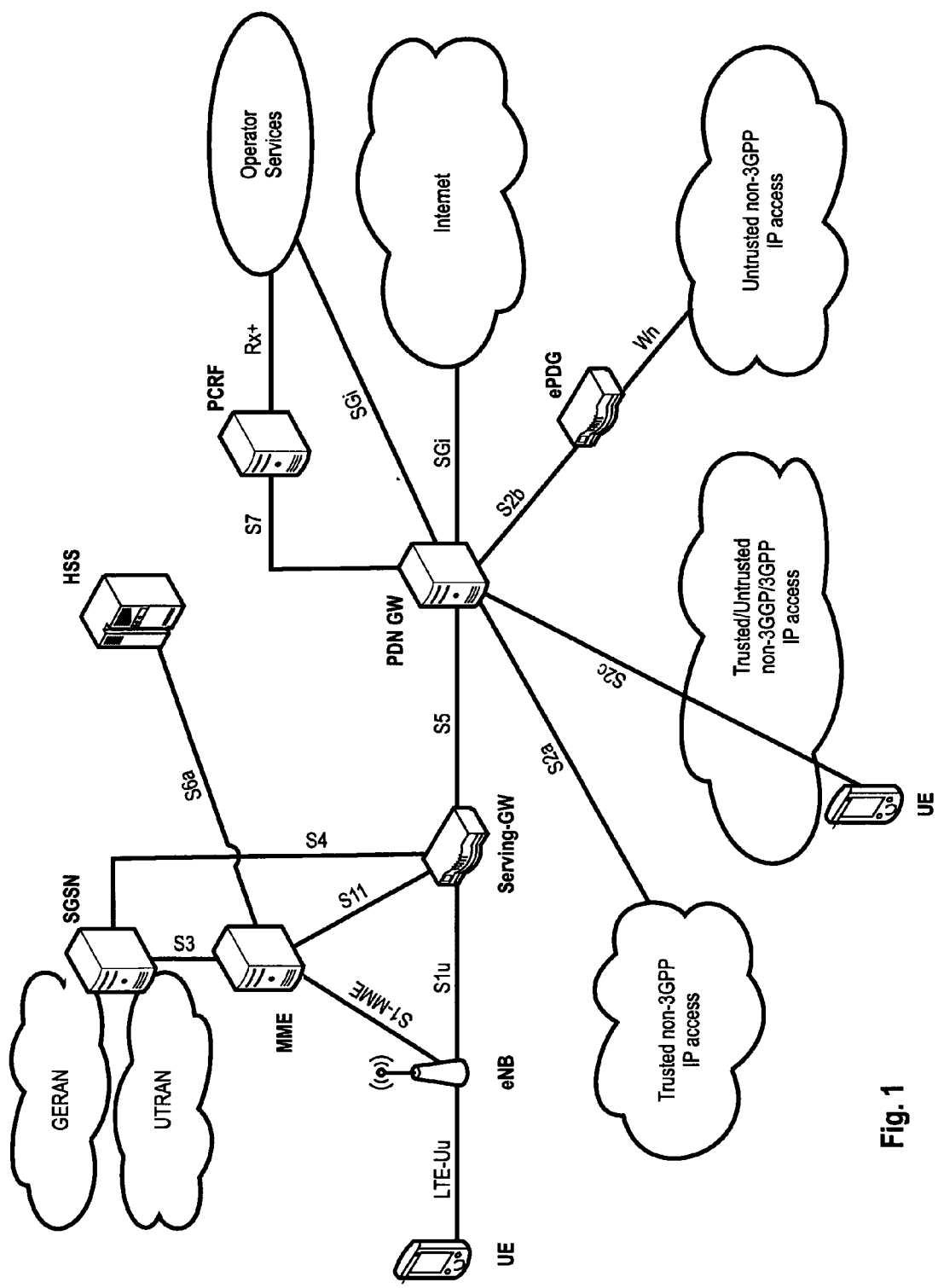
FIG. 1 shows an exemplary architecture of a 3GPP LTE system.
Figure 2:
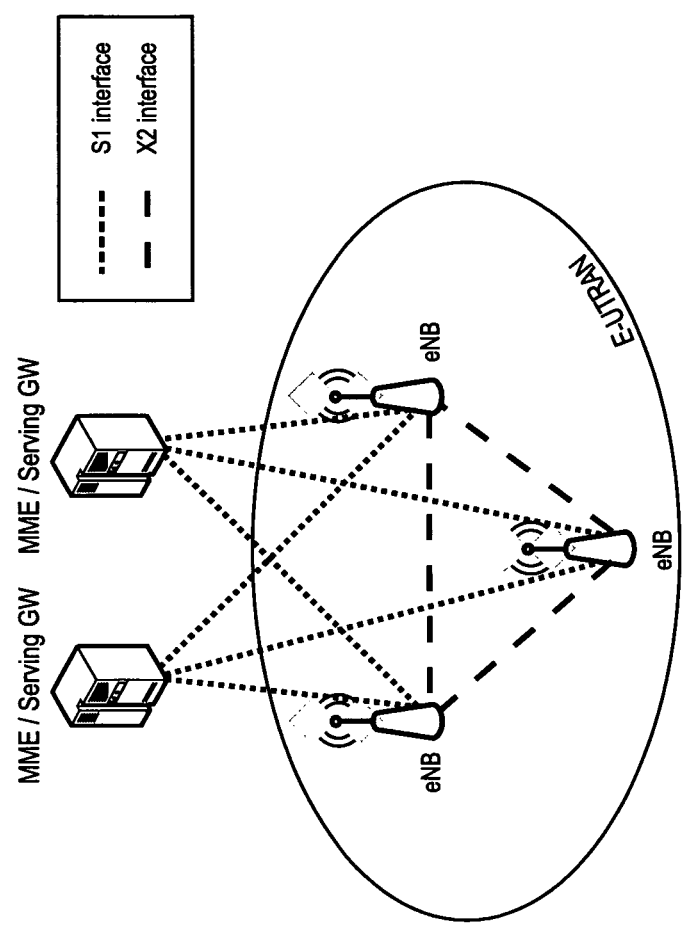
FIG. 2 shows an exemplary overview of the overall E-UTRAN architecture of 3GPP LTE.
Figure 3:
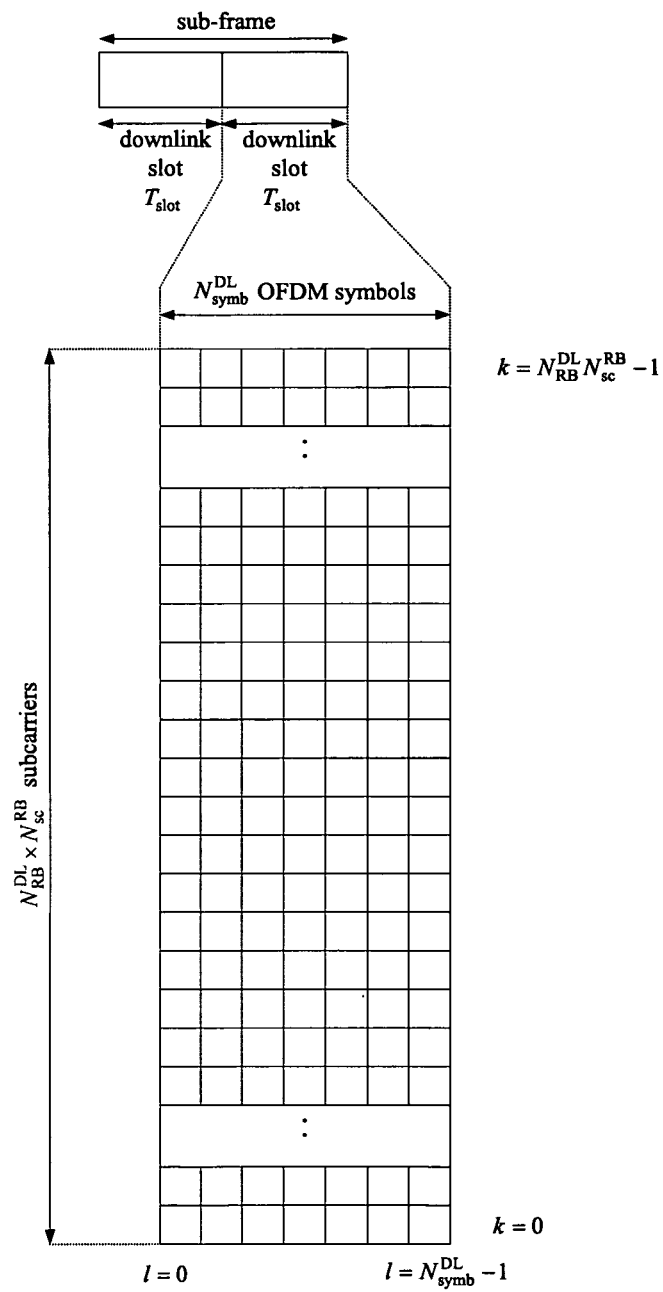
FIG. 3 shows an exemplary sub-frame structure on a downlink component carrier as defined for 3GPP LTE (Release 8/9)
Figure 4:
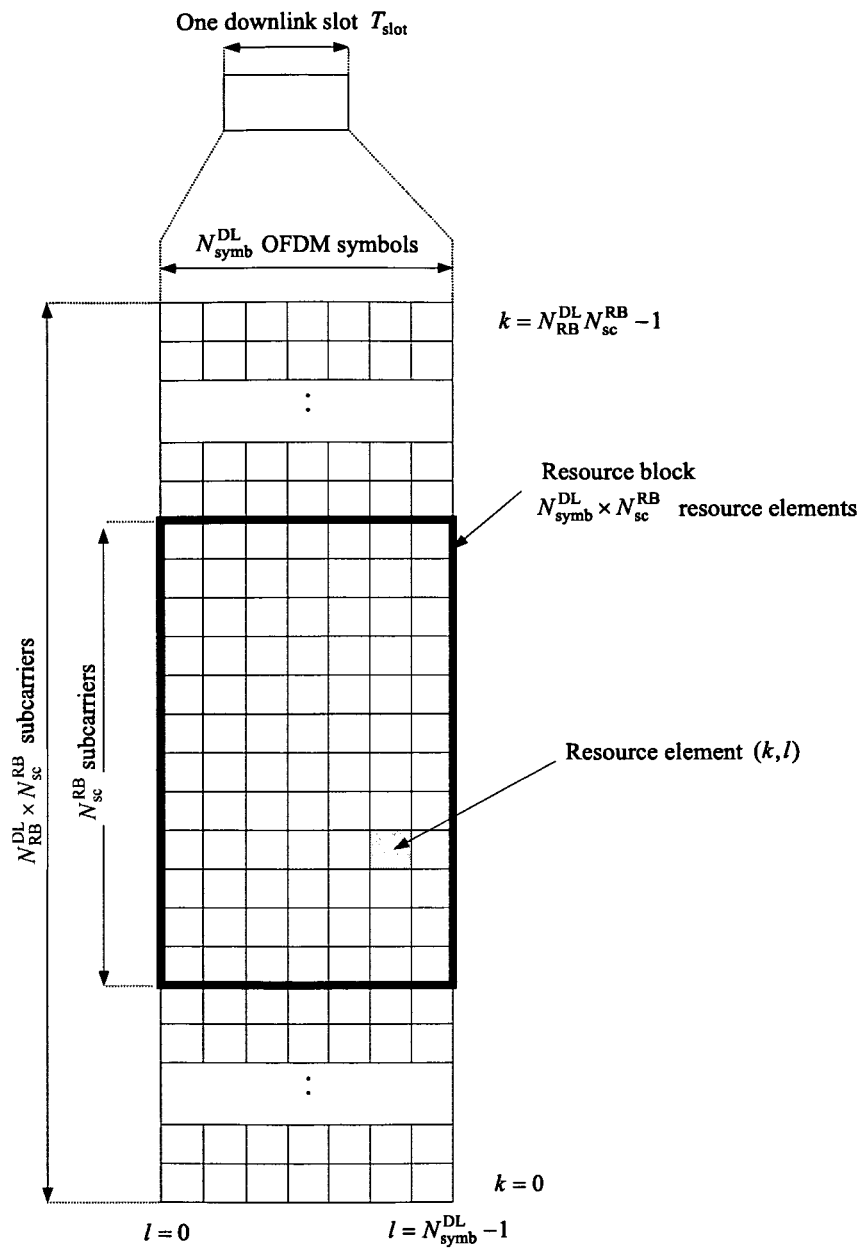
FIG. 4 shows an exemplary downlink resource grid of a downlink slot as defined for 3GPP LTE (Release 8/9)
Figure 5:
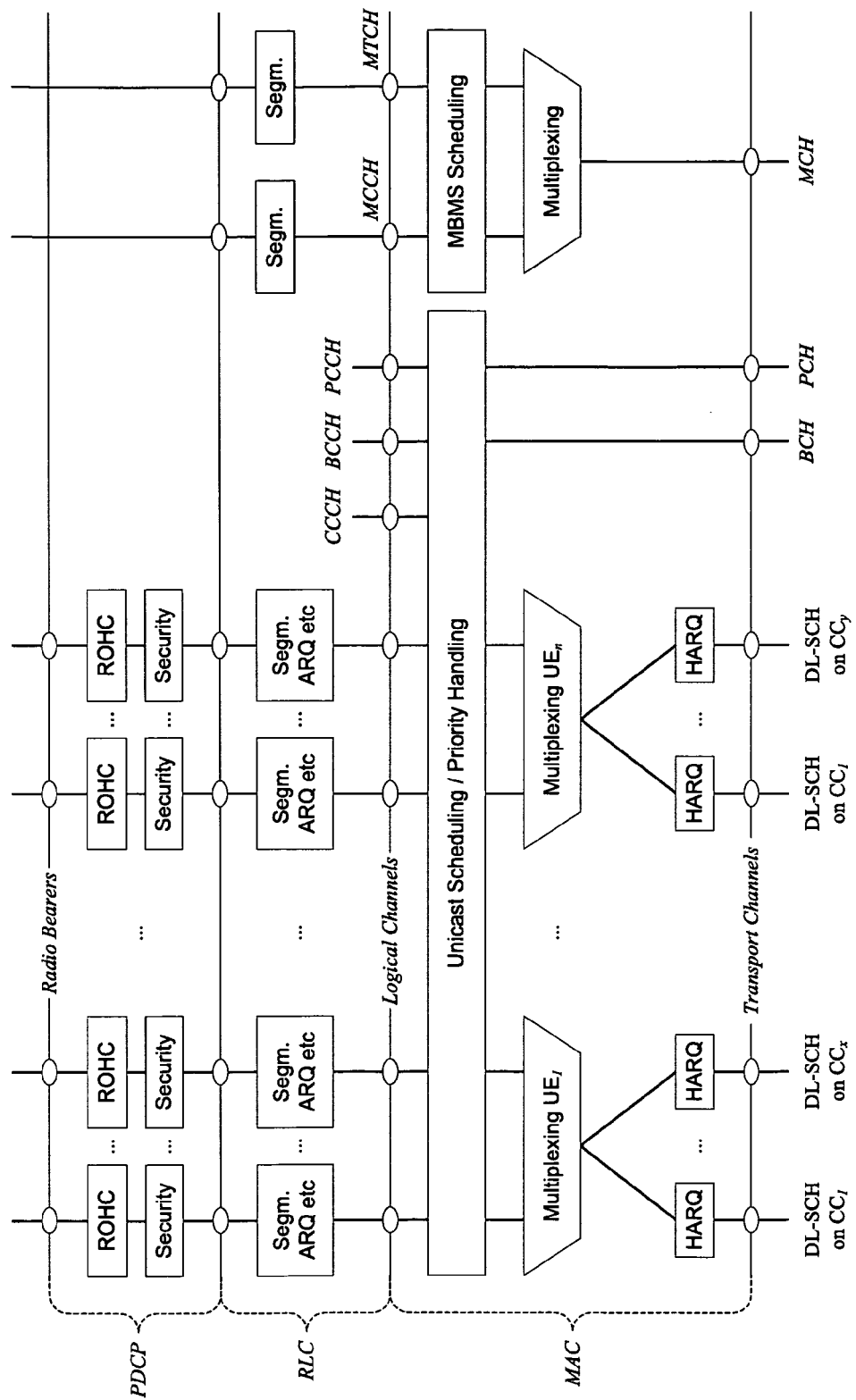
FIGS. 5 & 6 show the 3GPP LTE-A (Release 10) Layer 2 structure with activated carrier aggregation for the downlink and uplink, respectively.
Figure 6:
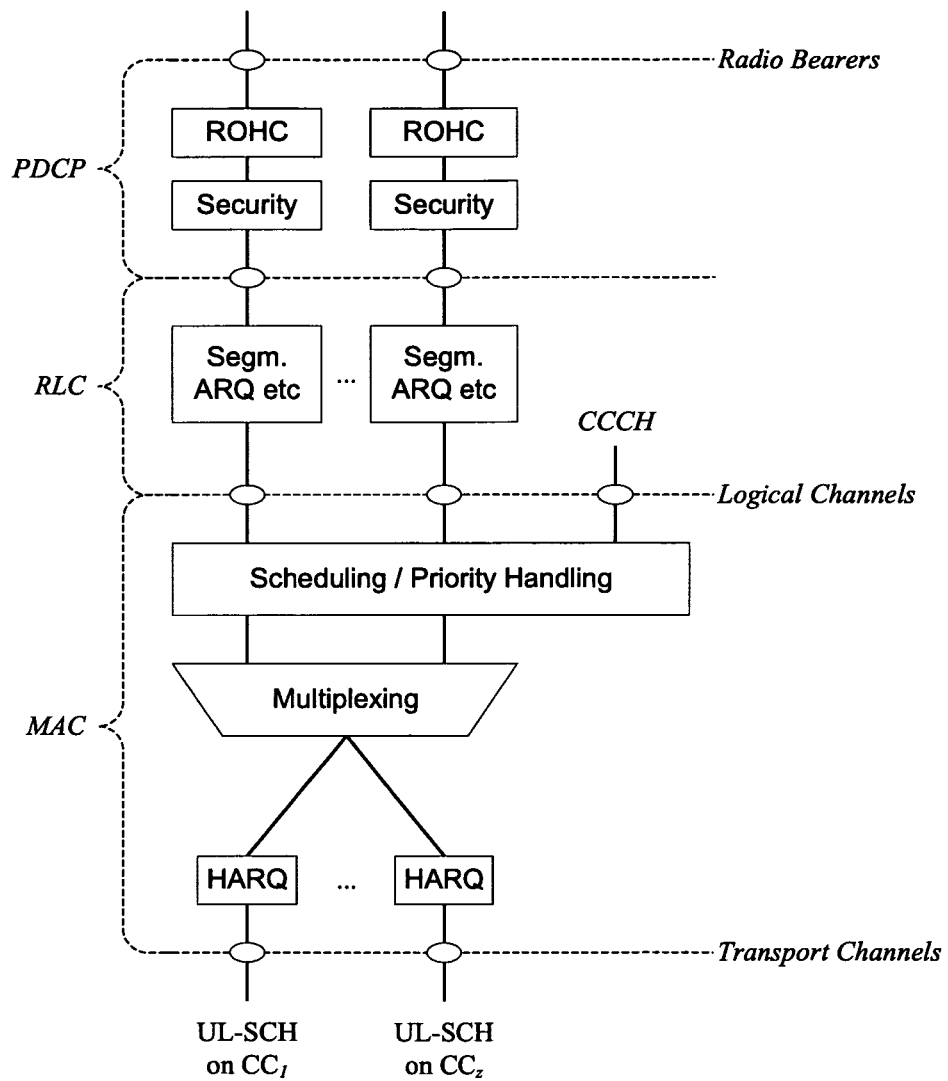
Figure 7:
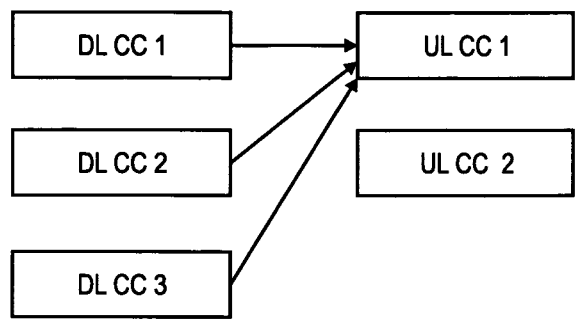
FIGS. 7 & 8 show exemplarily linkages between downlink and uplink component carriers in 3GPP LTE-A (Release 10)

The following paragraphs will describe various embodiments of the invention. For exemplary purposes only, most of the embodiments are outlined in relation to an orthogonal single-carrier uplink radio access scheme according to 3GPP LTE (Release 8) and LTE-A (Release 10) mobile communication systems discussed in the Technical Background section above. It should be noted that the invention may be advantageously used for example in connection with a mobile communication system such as 3GPP LTE (Release 8) and LTE-A (Release 10) communication systems previously described, but the invention is not limited to its use in this particular exemplary communication network.

The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network.

As described above, one major drawback of the prior art as known from a 3GPP LTE-A (Release 10) system is the necessity to send two PDCCHs in order to activate a downlink component carrier. The problem in this prior art solution is that a single downlink PDCCH indicating the activation of a downlink component carrier cannot simultaneously allocate PDSCH resources. Since PDCCH and PDSCH are transmitted in the same sub-frame in 3GPP LTE, i.e. PDCCH is transmitted for example within the first three OFDM symbols of a sub-frame, and the user equipment is not aware when a downlink component carrier is activated it cannot receive downlink data on the PDSCH within the same sub-frame on the newly activated downlink component carrier, when an activation PDCCH for this downlink component carrier is signaled.

The present invention provides a method where a single uplink or downlink resource assignment is used in order to activate/deactivate downlink component carriers and further allows simultaneously scheduling of uplink, respectively downlink resources. According to one aspect of the invention, a new uplink resource assignment format is proposed that is allowing the activation/deactivation of individual downlink component carriers configured for a mobile terminal (referred to as user equipment in the 3GPP terminology). The new uplink resource assignment comprises an indication of the activation state of the configured downlink component carriers, i.e. indicates which downlink component carrier(s) is/are to be activated or deactivated. Furthermore, in accordance with another aspect of the invention, a new downlink resource assignment format is proposed that is allowing the activation/deactivation of individual downlink component carriers configured for a mobile terminal and the simultaneous assignment of downlink resources for the transmission of downlink data to the mobile terminal. The new downlink resource assignment comprises an indication of the activation state of the configured downlink component carriers, i.e. indicates which downlink component carrier(s) is/are to be activated or deactivated.

This indication in both resource assignments may be sent for all configured component carriers, or for all configured component carriers other than the one downlink component carrier which needs to be always activate for a user equipment in RRC connected mode (this component carrier is referred to as the anchor carrier of the user equipment).

Moreover, the indication of the activation state is for example implemented by means of a bit-mask that indicates which of the configured downlink component carriers are to be activated respectively deactivated.

Alternatively, if the proposed resource assignment for uplink, respectively downlink should only activate or deactivate one single configured downlink component carrier, the indication would need to indicate at least an identifier of the configured downlink component carrier to be (de)activated. The indication of the identifier of the configured downlink component carrier would then cause the mobile terminal to toggle the activation state of the indicated downlink component carrier (configured but deactivated ↔ active). For signaling the component carrier ID, there would be $\lceil \log_2(N-1) \rceil$ bits required, given that the anchor carrier cannot be activated/deactivated by the uplink resource assignment, where N is the number of configured component carriers and $\lceil x \rceil$ is the ceiling function.

As an implicit indication of the activation state may lead to a de-synchronization of the activation states in the mobile terminal and the access network (base station), it may be advantage to include a further additional bit/flag to the uplink resource assignment that is explicitly indicting the activation state (configured but deactivated or active) for the indicated downlink component carrier.

Another alternative possibility to signal the activation state of the configured downlink component carriers would be the use of a single bit/flag that indicates the activation state (configured but deactivated or active) of all downlink component carriers other than the one downlink component carrier which is always active, e.g. the "special" or anchor component carrier in the downlink. This would only allow the simultaneous activation or deactivation of all non-anchor component carriers, but would significantly reduce the signaling overhead.

Considering the use of this new uplink, respectively downlink resource assignment format in a 3GPP based communication system using carrier aggregation in the downlink, such as 3GPP LTE-A (Release 10) or future releases using carrier aggregation, the new resource assignment format may be considered an extension to existing DCI formats, or a new DCI format.

In one exemplary embodiment of the invention, the DCI format of the uplink, respectively downlink resource assignment has the same size as at least one other DCI format defined in the communication system. Furthermore, in a 3GPP based communication system using OFDM on the downlink, it can be assumed that the resource assignment is forming the payload (DCI) of a PDCCH transmitted within a sub-frame on a downlink component carrier to one or more user equipments and the user equipments perform a blind decoding on the different DCI formats signaled in a sub-frame on PDCCH. Using the same size as at least one other DCI format defined in the communication system for the resource assignment format, and using an implicit or explicit indication of this format (as will be explained below in further detail) it is possible not to increase the blind decoding efforts of a mobile terminal.

If using a bit-mask to indicate the activation state of the downlink component carriers configured for a given mobile terminal, each of the bits in the bit-mask is for example associated to a respective configured downlink component carrier of plural configured downlink component carriers, and indicates its activation state. By checking this bit-mask comprised in the uplink, respectively downlink resource assignment, the mobile terminal can determine for each of the configured downlink component carriers, whether the activation state of the respective downlink component carrier is changed, i.e. which one or ones of the configured downlink component carriers need to be activated or deactivated.

In one exemplary embodiment and implementation of the invention, a downlink component carrier could be defined to be in one of the following three activation states: non-configured, configured but deactivated and active. When a downlink component carrier is configured but deactivated, the user equipment does not need to receive the corresponding PDCCH or PDSCH, nor is it required to perform CQI measurements. Conversely, when a downlink component carrier is active, the user equipment shall receive PDSCH and PDCCH (if present), and is expected to be able to perform CQI measurements. After configuration of component carrier(s) same is/are in configured but deactivated state. In order to enable PDCCH and PDSCH reception on a downlink component carrier, the downlink component carrier needs to be transitioned from configured but deactivated state to active state. The new proposed uplink, respectively downlink resource assignment may for example be used for indicating state transitions between configured but deactivated and active ("configured and activated"). If using a bit-mask for this purpose, the logical value 1 of a bit of the bit-mask may indicate the configured downlink component carrier associated to the bit being active, while the logical value 0 of a bit of the bit-mask may indicate the corresponding configured downlink component carrier associated to the bit being configured but deactivated (or vice versa).

Since the proposed uplink/downlink resource assignment is received on one of the configured downlink component carrier, this implies that this downlink component carrier is in active state. For example, the downlink component carrier on which the uplink/downlink resource assignment is received may be (always) a designated "special" component carrier (or anchor component carrier) that is always configured and activated for the mobile terminal. Hence, the uplink resource assignment does not need to (but may) include an indication of the activation state for this special component carrier.

If also an indication of the activation state for the special component carrier is signaled, and irrespective of whether the proposed new uplink/downlink resource assignment is signaled on the special component carrier or another configured component carrier, it may be for example possible to reconfigure the special component carrier by means of the new uplink/downlink resource assignment discussed herein.

Furthermore, in a more advanced exemplary implementation, the uplink resource assignment including the component carrier activation/deactivation information may also instruct the mobile terminal to send a channel quality measurement for the newly activated component carriers (i.e. those component carrier(s) for which the state has changed from deactivated to activated). Accordingly, the mobile terminal performs a channel quality measurement for each activated component carrier and sends the result of the measurement to the base station (referred to as eNodeB in the 3GPP terminology) on the uplink resources that have been assigned to the mobile terminal by means of the uplink resource assignment. The channel quality measurement results may be for example signaled in form of CQI information.

The transmission of the channel quality measurement result(s) indicates to the base station that the mobile terminal has successfully received the uplink resource assignment, respectively, has successfully activated/deactivated the configured downlink component carriers. Hence, the transmission of the channel quality measurement result(s) can be considered an acknowledgment of the uplink resource assignment, respectively the activation/deactivation of configured downlink component carriers by the mobile terminal.

Another aspect of the invention is related to the distinction of the new proposed uplink/downlink resource assignments from an "ordinary" uplink/downlink resource assignment, in particular when assuming that the mobile terminals perform a blind decoding of the downlink control channel information (DCI formats). Hence, the format of the new proposed resource assignments may need to be distinguished from other DCI formats. One possibility is to define a new DCI format (of a new given size) for the resource assignments proposed herein. This may however imply an increase in the blind decoding attempts that need to be performed by the mobile terminal in order to decode the new DCI format. An alternative implementation according to a further embodiment of the invention is to reuse existing DCI formats for signaling an uplink/downlink resource assignment and to provide the distinction of the different uplink resource assignment formats by using unused codepoints in some field(s) of the reused existing DCI format or by means of masking the CRC attachment with a newly defined RNTI defined per mobile terminal for component carrier (de)activation.

For example, when implementing the invention in a 3GPP-based system like LTE-A (Release 10) or its successors, the uplink DCI format 0 as defined for 3GPP LTE (Release 8/9) or the downlink DCI format 1A as defined for 3GPP LTE (Release 8/9), could be reused for (de)activation of downlink component carrier(s). If an uplink/downlink resource assignment that is (de)activating downlink component carrier(s) is signaled, its CRC may be for example scrambled with a new user equipment-specific RNTI defined for this purpose, referred to as CC-RNTI in the following. The CC-RNTI may be for example allocated to a user equipment when the eNodeB configures the set of uplink/downlink component carrier(s). The CC-RNTI may be for example signaled to a user equipment in a RRC Connection Reconfiguration message which includes the set of downlink/uplink component carriers(s) to be aggregated. Hence, by detecting at the user equipment that the CRC attachment of the payload of the PDCCH (i.e. the resource assignment in this case) is masked by the CC-RNTI, the user equipment could thus conclude on the format of the payload of the PDCCH and appropriately read the different fields of the uplink resource assignment including information on the (de)activation of configured downlink component carrier(s).

According to another alternative embodiment of the invention, a CIF field (if present) in the uplink/downlink resource assignment may be used in order to indicate the format of the payload of the PDCCH, i.e. whether the payload is a normal uplink/downlink resource assignment or a uplink resource assignment including information on the (de)activation of configured downlink component carrier(s). As described in the technical background section, the CIF (carrier indicator field) is comprised of three bits and identifies the component carrier for which the specific control signaling information is intended, i.e. in cross-carrier scheduling scenarios. Since three bits offer 8 codepoints, but there could be at most 5 downlink/uplink components configured for an user equipment, some of the CIF codepoints are unused, i.e. codepoints 6, 7 and 8. According to this embodiment, at least one of those unused codepoints of the CIF field is used to indicate that the uplink/downlink resource assignment comprises information on the (de)activation of downlink component carrier(s) and the user equipment will know how to interpret certain bits in the payload of the PDCCH. As the DCI formats for normal uplink/downlink resource assignments (without information on the (de)activation of configured downlink component carrier(s)) and uplink/downlink resource assignments with information on the (de)activation of configured downlink component carrier(s) are distinguished by the codepoint signaled in the CIF field, the same RNTI as used for uplink grants (C-RNTI) can be used to scramble the CRC. Hence, no additional new CC-RNTI would need to, be defined in this alternative embodiment.

Furthermore, in another embodiment of the invention, the two possibilities how to indicate the DCI format of the PDCCH payload described above may be used together. As mentioned in the technical background section, in 3GPP LTE-A (Release 10) the presence of CIF in an uplink PDCCH is configurable. Therefore, user equipments that are configured to include CIF in the PDCCH payload, the eNodeB uses the predefined CIF codepoint(s) to indicate that PDCCH payload is a resource assignment with information on the (de)activation of configured downlink component carrier(s). User equipments that are configured to not include CIF in the PDCCH payload will be assigned the CC-RNTI discussed above, which is then used by the eNodeB to distinguish resource assignments with information on the (de)activation of configured downlink component carrier(s) from normal resource assignments (without information on the (de)activation of configured downlink component carrier(s)).

As outlined above, the introduction of a CC-RNTI or the reservation of at least one CIF codepoint allows the redefinition of some of the DCI fields to incorporate the indication of the downlink component carrier(s) to be (de)activated. Exemplarily assuming that there is a maximum of N=5 configured downlink component carriers, and that there is no activation state to be signaled for the specific downlink component carrier which is always active, e.g. the anchor carrier, N−1=4 bits are needed in order to have the possibility to activate/deactivate any combination of downlink component carriers using a bit-mask. Each bit in the bit-mask thereby represents the activation state of one of the downlink component carriers. For example, a bit within the bit-mask set to "1" may indicate that the corresponding downlink component carrier should be activated; a bit set to "0" indicates that the corresponding downlink component carrier should be deactivated (or vice versa).

In one exemplary embodiment of the invention, one of DCI formats already existing in the respective system where the invention is implemented is redefined in order to encompass the signaling of the bit-mask to indicate the (de)activation of the configured downlink component carrier(s). With respect to the implementation of the proposed uplink resource assignment, and if reusing an uplink DCI format 0 already defined in 3GPP LTE (Release 8/9) or 3GPP LTE-A (Release 10), 4 bits need to be redefined in this DCI format in order to be able to signal within the bit-mask (assuming that there is a maximum of N=5 configured downlink component carriers). FIG. 9 shows the DCI format 0 for FDD in 3GPP LTE (Release 8/9). The DCI format 0 consists of:
- a format flag (Flag Format 0/1A) for distinguishing DCI Format 0 and DCI format 1A, which are defined to have the same number of bits/size,
- a hopping flag (Hopping Flag) indicating whether or not the user equipment should employ uplink resource hopping,
- a resource block assignment field assigning uplink resources on the PUSCH to the user equipment (when triggering aperiodic channel quality feedback, the channel quality feedback and optionally further user data is multiplexed and transmitted on these assigned resources via that PUSCH),
- a modulation and coding scheme field (MCS&RV) that is indicating the modulation scheme, coding rate and the redundancy version for the transmission on the assigned resources on the PUSCH,
- a new data indicator (NDI) to indicate whether the user equipment has to send new data or a retransmission,
- a DMRS field (Cyclic Shift DMRS) for configuring the cyclic shift applied to the reference symbol sequence,
- a CQI request flag for triggering an aperiodic channel quality feedback report from the user equipment, and
- if required one or more padding bit(s) to align the size of the dedicated control information to a predetermined number of bits.

Furthermore, as shown in FIG. 10 the extended DCI format 0 in 3GPP LTE-A (Release 10) is essentially similar to the DCI format 0 of 3GPP LTE (Release 8/9), except for further including the CIF field for indicating the uplink component carrier to which the signaled resource assignment pertains in cross-scheduling scenarios.

Under the assumption that the uplink transmission which is scheduled by the uplink resource assignment including the information on the (de)activation of downlink component carrier(s), implies a new initial transmission, the NDI bit, which usually indicates initial/retransmission, can be reused. Similarly the "CQI request" flag could be reused since it could be defined by rule, that the user equipment has always to transmit an aperiodic CQI when downlink component carrier(s) are activated. The remaining two bits which are required for the signaling of the 4-bit bitmask may for example stolen from the TPC bits, since there are not necessarily required for the transmission of the aperiodic CQI: Robustness of the uplink transmission may also be achieved by properly choosing a conservative modulation and coding scheme, so that no further power control may be required.

Figure 11:
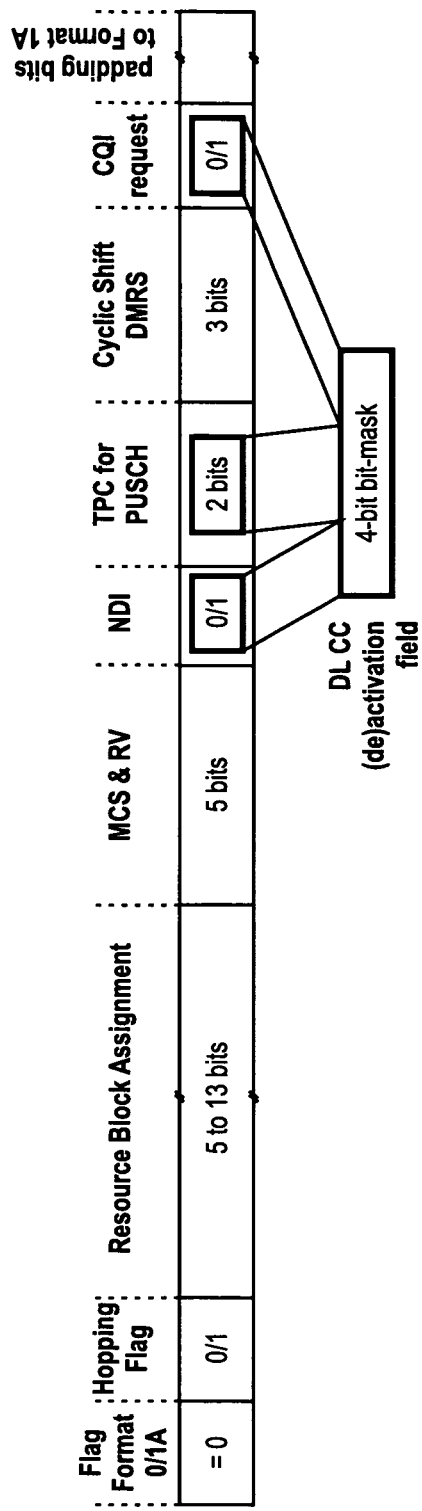
FIG. 11 shows an exemplary improved DCI format 0 for (de)activating configured downlink component carriers for use in 3GPP LTE-A (Release 10) and according to an exemplary embodiment of the invention.

Hence, the user equipment could interpret the content of the decoded downlink control channel information obtained from the PDCCH depending on which RNTI has been used to scramble the CRC code of the CRC attachment. If the CC-RNTI has been used by the base station to mask the CRC of the uplink resource assignment, the user equipment will interpret the NDI flag, the TPC field and the CQI flag of DCI format 0 as a 4-bit bit-mask that indicates which of the configured downlink component carrier(s) is/are to be (de)activated. FIG. 11 shows an exemplary improved DCI format 0 for (de)activating configured downlink component carriers for use in 3GPP LTE-A (Release 10) and according to an exemplary embodiment of the invention, where the NDI flag, the TPC field and the CQI flag are interpreted as a bit-mask, in case the CC-RNTI has been used to scramble the CRC. If the CRC in the CRC attachment has been masked with the C-RNTI, the user equipment interprets the fields of DCI format 0 as defined for 3GPP LTE (Release 8/9) and as shown in FIG. 9—i.e. as a "normal" uplink resource assignment.

Figure 12:
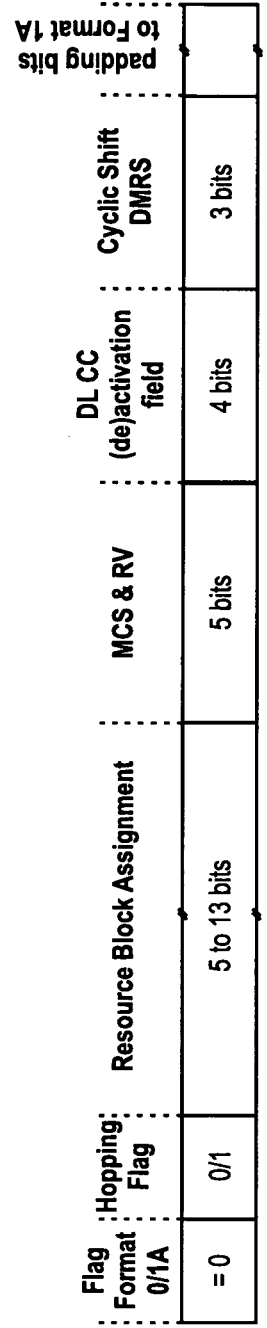
FIG. 12 shows another exemplary improved DCI format 0 for (de)activating configured downlink component carriers for use in 3GPP LTE-A (Release 10) and according to an exemplary embodiment of the invention.

FIG. 12 shows another exemplary improved DCI format 0 for (de)activating configured downlink component carriers for use in 3GPP LTE-A (Release 10) and according to an exemplary embodiment of the invention. In this example, a new DCI format is defined which is based on the DCI format 0 known from 3GPP LTE (Release 8/9). As for the example of FIG. 11, it can be ensured that the size of the format is similar to DCI format 0 and 1A, so that no further blind decoding attempt is needed by the user equipment to decode this new DCI format. In the exemplary DCI format shown in FIG. 12, a new DL CC (de)activation field is defined, which is consisting of 4 bits to convey the bit-mask. As outlined above in connection with FIG. 11, the NDI flag, the TPC field and the CQI flag are omitted in the uplink resource assignment of FIG. 12 to accommodate the DL CC (de)activation field.

Although the exemplary embodiments described above have been explained in connection with reusing the DCI format 0 of 3GPP LTE (Release 8/9), it is likewise possible to reuse DCI format 0 of 3GPP LTE-A (Release 10). In the latter case, the DCI format reuse or the new DCI format of the uplink resource assignment the for (de)activating configured downlink component carriers would look like the examples in FIG. 11 and FIG. 12, except for additionally including a CIF field.

Please also note that the reuse of the NDI flag, the TPC field and the CQI flag is just one example for reusing the fields of the DCI format 0 of 3GPP LTE (Release 8/9) and LTE-A (Release 10). Another option is to reuse the Flag Format 0/1A, the TPC field and the CQI flag or alternatively Flag Format 0/1A, the TPC field and NDI flag to free 4 bits that can be used to signal the bit-mask for (de)activating downlink component carrier(s). If the CC-RNTI is used for indicating the DCI format, the Flag Format 0/1A would no longer be needed in the DCI format and could therefore be reused.

Alternatively assuming that the uplink transmission scheduled by the uplink resource assignment should be robust, a modulation scheme yielding high spectral efficiency (such as 64-QAM) would likely not be used for the transmission required. This would allow using only 4 out of the 5 bits for the MCS field for the signaling of the modulation and coding scheme, so that "only" $2^4=16$ MCS levels could be signaled. The "freed" 1 bit of the MCS field could also be used as one bit of the bit-mask. This would for example allow reusing the Flag Format 0/1A, the NDI flag, 1 bit of the MCS field and the CQI flag for the signaling of the 4-bit bit-mask. This way, the TPC commands may still be signaled thereby further improving control of the reliability of the uplink transmission.

Hence, the bit-mask for signaling the activation state of the downlink component carriers may thus be formed by an arbitrary combination of the following fields of DCI format 0 of 3GPP LTE (Release 8/9) or 3GPP LTE-A (Release 10):
Flag Format 0/1A (1 bit),
1 bit of the MCS field,
NDI flag (1 bit),
TPC command field (2 bits), and
CQI request flag (1 bit),
that yields 4 bits for signaling of the bit-mask.

Alternatively, as mentioned previously, if the uplink resource assignment should only activate or deactivate one single configured downlink component carrier, the indication would need to indicate at least an identifier of the configured downlink component carrier to be (de)activated. The indication of the identifier of the configured downlink component carrier would then cause the mobile terminal to toggle the activation state of the indicated downlink component carrier (configured but deactivated ↔ active). For signaling the component carrier ID, there would be $\lceil \log_2(N-1) \rceil$ bits required, given that the anchor carrier cannot be activated/deactivated by the uplink resource assignment. For the case of N=5 this would mean that 2 bits would be required to signal the indication of the configured downlink component carrier to be (de)activated, respective 3 bits would be required to signal the indication of the configured downlink component carrier to be (de)activated and an explicit indication of the activation state.

According to another embodiment, DL CC (de)activation field for signaling the activation state of the one downlink component carrier may thus be formed by an arbitrary combination of the following fields of DCI format 0 of 3GPP LTE (Release 8/9) or 3GPP LTE-A (Release 10):
Flag Format 0/1A (1 bit),
1 bit of the MCS field,
NDI flag (1 bit),
TPC command field (2 bits), and
CQI request flag (1 bit),
that yields 2 bits (respectively 3) bits for signaling an identifier the one downlink component carrier to be (de)activated (and the explicit indication of the activation state). One exemplary implementation to obtain 3 bits for signaling an identifier the one downlink component carrier to be (de)activated and the explicit indication of the activation state would be the combination Flag Format 0/1A, NDI flag and CQI request flag. Similarly, also the TPC command field and one of the Flag Format 0/1A, NDI flag and CQI request flag could be used.

In another exemplary embodiment, the activation state of the configured downlink component carriers is signaled by a single bit/flag that indicates the activation state (configured but deactivated or active) of all downlink component carriers other than the one downlink component carrier which is always active, e.g. the "special" or anchor component carrier in the downlink. This allows only a simultaneous activation or deactivation of all non-anchor component carriers, but would significantly reduce the signaling overhead. For signaling this single bit/(de)activation flag one of the following flags:
Flag Format 0/1A (1 bit),
1 bit of the MCS field,
NDI flag (1 bit),
TPC command field (2 bits),
CQI request flag (1 bit)
of DCI format 0 of 3GPP LTE (Release 8/9) or 3GPP LTE-A (Release 10) may be reused.

As to the implementation of the downlink resource assignment enabling the signaling of the activation state of downlink component carriers in the 3GPP context, another embodiment of the invention proposes the reuse or redefinition of downlink DCI format 1A of 3GPP LTE (Release 8/9) or 3GPP LTE-A (Release 10).

The downlink DCI format 1A for FDD mode of 3GPP LTE (Release 8/9) is shown in FIG. 17 and consists of:
a format flag (Flag Format 0/1A) for distinguishing DCI Format 0 and DCI format 1A, which are defined to have the same number of bits/size
Localized/Distributed assignment flag—indicating whether the localized or distributed transmission mode is used
Resource Block Assignment (RBA) field for assigning downlink resources (resource blocks) on the PDSCH to the user equipment according to the given resource allocation type. The number of bits required for the RBA field depends on the allocation type (RA field) and bandwidth of the assigned component carrier.
modulation and coding scheme field (MCS) that is indicating the modulation scheme, coding rate and the redundancy version for the transmission on the assigned resources on the PDSCH
HARQ process number indicating the HARQ process to be used for the downlink transmission on the assigned resources
new data indicator (NDI) flag for indicating that the transmission on the given HARQ process is a new protocol data unit (PDU)
redundancy version (RV) field for indicating the redundancy version of the downlink transmission on the assigned resources transmission power control (TPC) command field for transmission of control information on the PUCCH Downlink DCI format 1A of 3GPP LTE-A (Release 10) is shown in FIG. 18 and comprises in addition to the fields of downlink DCI format 1 of 3GPP LTE (Release 8/9) the a carrier indicator field (CIF) for indicating on which of the component carriers the resources are assigned. For TDD mode, the DCI formats 1A of 3GPP LTE (Release 8/9) and 3GPP LTE-A (Release 10) further comprise a Downlink Assignment Index.

Figure 19:
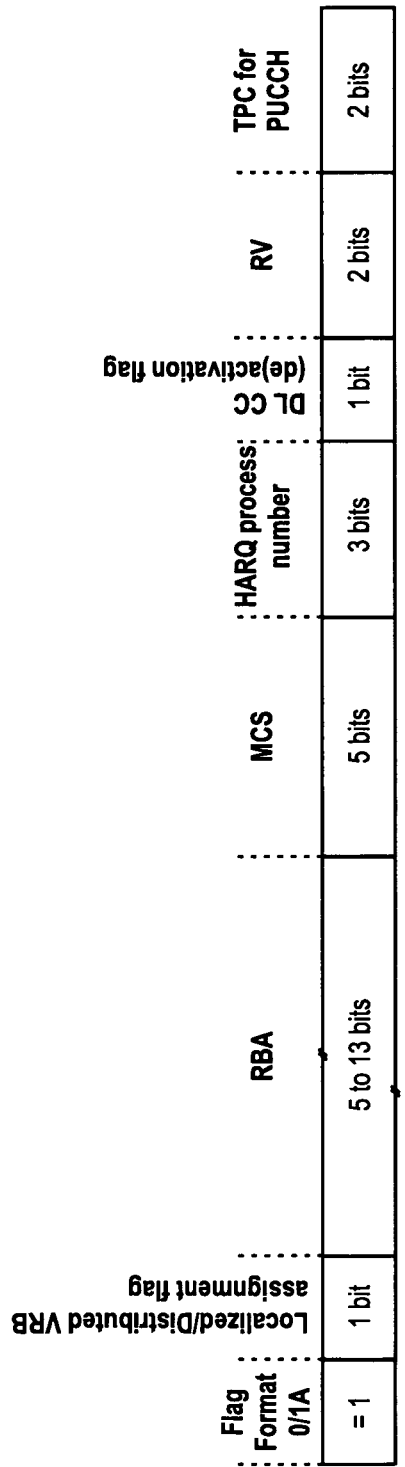
FIG. 19 shows an exemplary improved DCI format 1 for (de)activating configured downlink component carriers for use in 3GPP LTE-A (Release 10) and according to an exemplary embodiment of the invention.

According to another embodiment of the invention, the NDI bit of DCI format 1A is reused to provide a flag (DL CC (de)activation flag) that allows the eNodeB to activate or deactivate all downlink component carriers other than the always active downlink component carrier. An example of a new DCI format for the downlink resource assignment comprising the DL CC (de)activation flag is shown in FIG. 19. In another alternative embodiment of the invention, the TPC command for PUCCH field of DCI format 1A or NDI flag and TPC command for PUCCH field are reused and form a DL CC (de)activation field. An exemplary DCI format for the downlink resource assignment is shown in FIG. 20.

Figure 20:
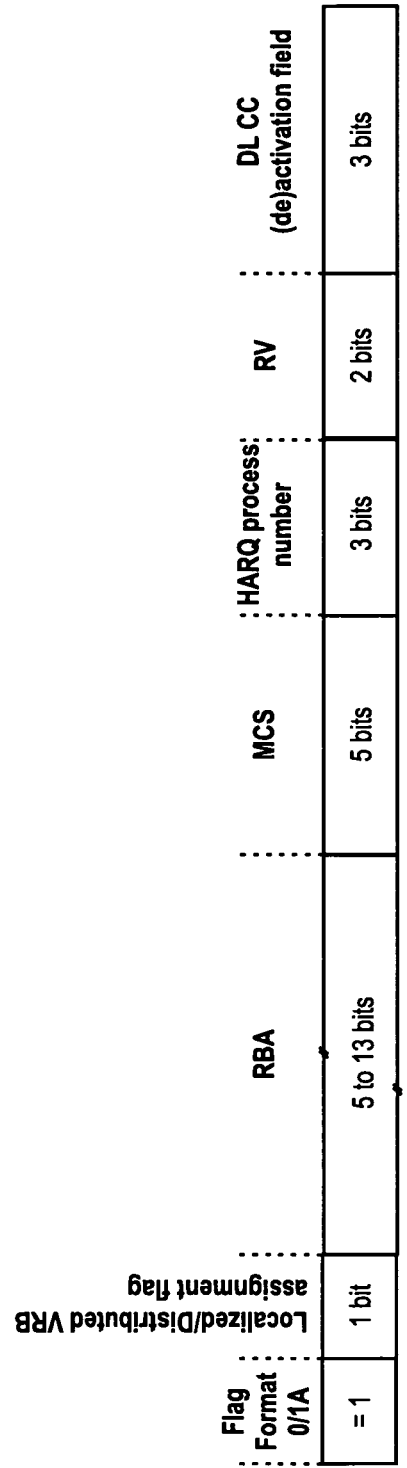
FIG. 20 shows another exemplary improved DCI format 1 for (de)activating configured downlink component carriers for use in 3GPP LTE-A (Release 10) and according to an exemplary embodiment of the invention.
Figure 21:
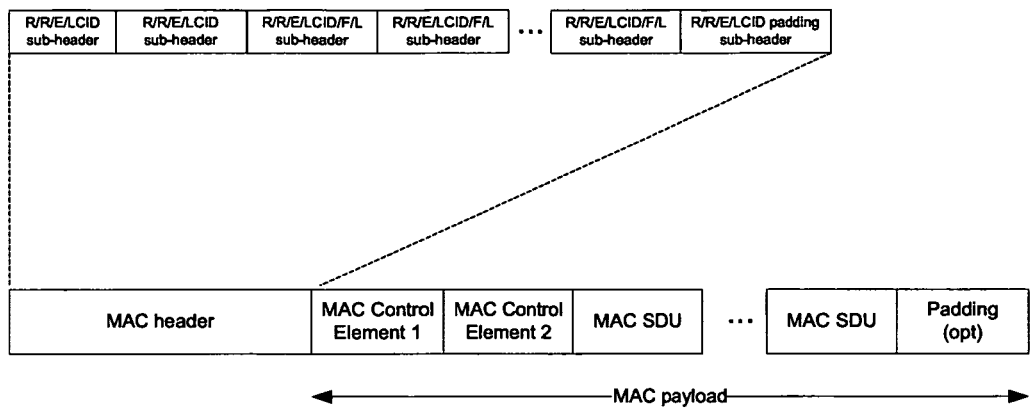
FIG. 21 shows the format of an exemplary MAC PDU.

Please note that the DCI format in the examples of FIG. 19 and FIG. 20 may further include a CIF field as shown in FIG. 18. In case the NDI flag of the DCI format 1A is reused, it may be desirable to define that the downlink transmission (transport block) to the user equipment on the allocated downlink resources is always an initial transmission, when the proposed downlink resource assignment including the DL CC (de)activation flag is received. Furthermore, the user equipment may also assume a known NDI value for the HARQ process that is providing the downlink transmission.

It should be noted that in all alternatives described above, a reuse of fields of the DCI format and interpretation of the content depending on the RNTI used for the masking of the CRC could be used (as explained in connection with FIG. 11) or the resulting contents of the DCI field can be defined as a new DCI format (as explained in connection with FIGS. 12, 19 and 20).

In the examples on how to signal an indication of the downlink component carrier(s) to be activated or deactivated discussed in the paragraphs above, it has been assumed that the base station assigns a special RNTI (CC-RNTI) to the user equipments for signaling information related to the activation and deactivation of the downlink component carriers configured by a respective user equipment. Based on the use of the CC-RNTI, the user equipments can determine how the DCI format of the uplink/downlink resource assignment received on the PDCCH needs to be interpreted, respectively, which fields are contained therein.

In another alternative implementation according to another embodiment of the invention, the eNodeB uses one of one or more predefined CIF codepoints to indicate that PDCCH payload is an uplink/downlink resource assignment with information on the (de)activation of configured downlink component carrier(s), so that no special RNTI would be needed. The user equipment thus decodes the PDCCH and determines the DCI format (respectively the content/interpretation of the remaining fields in the DCI format) depending on the codepoint signaled in the CIF field. In this case the assigned uplink/downlink resources indicated by the PDCCH is intended for either a predefined uplink/downlink component carrier or for the uplink/downlink component carrier that would be used for the case of non cross-carrier scheduling, i.e. if no CIF field was present. This may be for example the uplink/downlink anchor component carrier of the mobile terminal.

FIG. 13 and FIG. 14 show an exemplary improved uplink DCI format 0 for (de)activating configured downlink component carriers for use in 3GPP LTE-A (Release 10) and according to this embodiment of the invention, where the interpretation of the content of the DCI format is depending on the codepoint of the CIF field. If the codepoint of the CIF field is "111", the DCI format (uplink resource assignment) comprises a DL CC (de)activation field for signaling the activation state of the downlink component carriers (see FIG. 13), while in case the codepoint is not "111", the DCI format is the DCI format 0 as shown in FIG. 10, and the CIF field indicate the cross-scheduled component carrier on which the uplink resources are assigned. Please note that the definition of special CIF codepoint(s) for indicating the DCI format is of course also applicable to the DCI format as shown in FIG. 19 and FIG. 20 for the downlink assignment case, assuming that a CIF field is added to the formats.

In another alternative implementation according to another embodiment of the invention, two predefined CIF codepoints are used for indication that the DCI format (resource assignment) comprises information identifying at least one DL component carrier which is to be activated respectively deactivated. If the codepoint of the CIF field is "111", the DCI format (resource assignment) indicates the activation of the at least one downlink component carrier identified by the identifier field, whereas when if the codepoint of the CIF field is "110" the DCI format indicates the deactivation of the at least one downlink component carrier identified by the identifier field in the DCI format.

Furthermore another aspect of the invention relates to the transmission of the aperiodic CQI in response to a downlink component carrier (de) activation. As explained above, in one example implementation, the activation of a downlink component carrier (transition from configured but deactivated state to active state) by means of an uplink resource assignment, causes the mobile terminal to perform a channel quality measurement for each of the newly activated component carrier and to signal the results of the measurement to the base station. Since it may not always be required or beneficial for the base station to receive CQI information when (de)activating downlink component carriers, it may be desirable for the base station to have the possibility to enable/disable the transmission of the channel quality measurements. In implementations where the CQI request flag is not used for signaling the indication of the activation status of the downlink component carriers, the CQI request flag could be used by the base station to control the transmission of CQI information for the newly activated downlink component carriers.

For cases where the CQI request flag is used for signaling the indication of the activation status of the downlink component carriers, according to one embodiment of the invention, it is proposed to control the transmission of channel quality feedback/CQI by setting the codepoint signaled in the Resource Block assignment (RBA) field. For example setting the RBA field to all "1"s, which is an invalid resource allocation, the base station may disable the channel quality feedback/CQI reporting. The user equipment would still (de)activate the downlink component carrier(s) as signaled, however without transmitting channel quality feedback/CQI information for the newly activated component carriers.

Another possibility to suppress channel quality reporting is related to the use of the CIF flag for distinguishing the uplink resource assignment formats (as explained in connection with FIG. 13 and FIG. 14 above). Since more that one CIF codepoint may not be needed, two codepoints may be reserved to indicate the format of the uplink resource assignment. One of these two codepoints could be defined to indicate the uplink resource assignment comprising information on the (de)activation of downlink component carrier(s) and requests the mobile terminal to report channel quality on the newly activated downlink component carriers, while the other of the two codepoints could be defined to indicate the uplink resource assignment comprising information on the (de)activation of downlink component carrier(s) and requests the mobile terminal not to report channel quality on the newly activated downlink component carriers.

In order to provide sufficient robustness for the downlink component carrier (de)activation signaling, it is proposed in another embodiment of the invention that a transmission on the uplink resources allocated by the uplink resource assignment (comprising the information on the downlink component carrier (de)activation) serves as an acknowledgement for the reception of the uplink resource assignment. Hence, if the channel quality is reported on the assigned uplink resources, upon reception of this channel quality information at the base station, same can assume that the uplink resource assignment (comprising the information on the downlink component carrier (de)activation) was correctly received by the mobile terminal.

Figure 15:
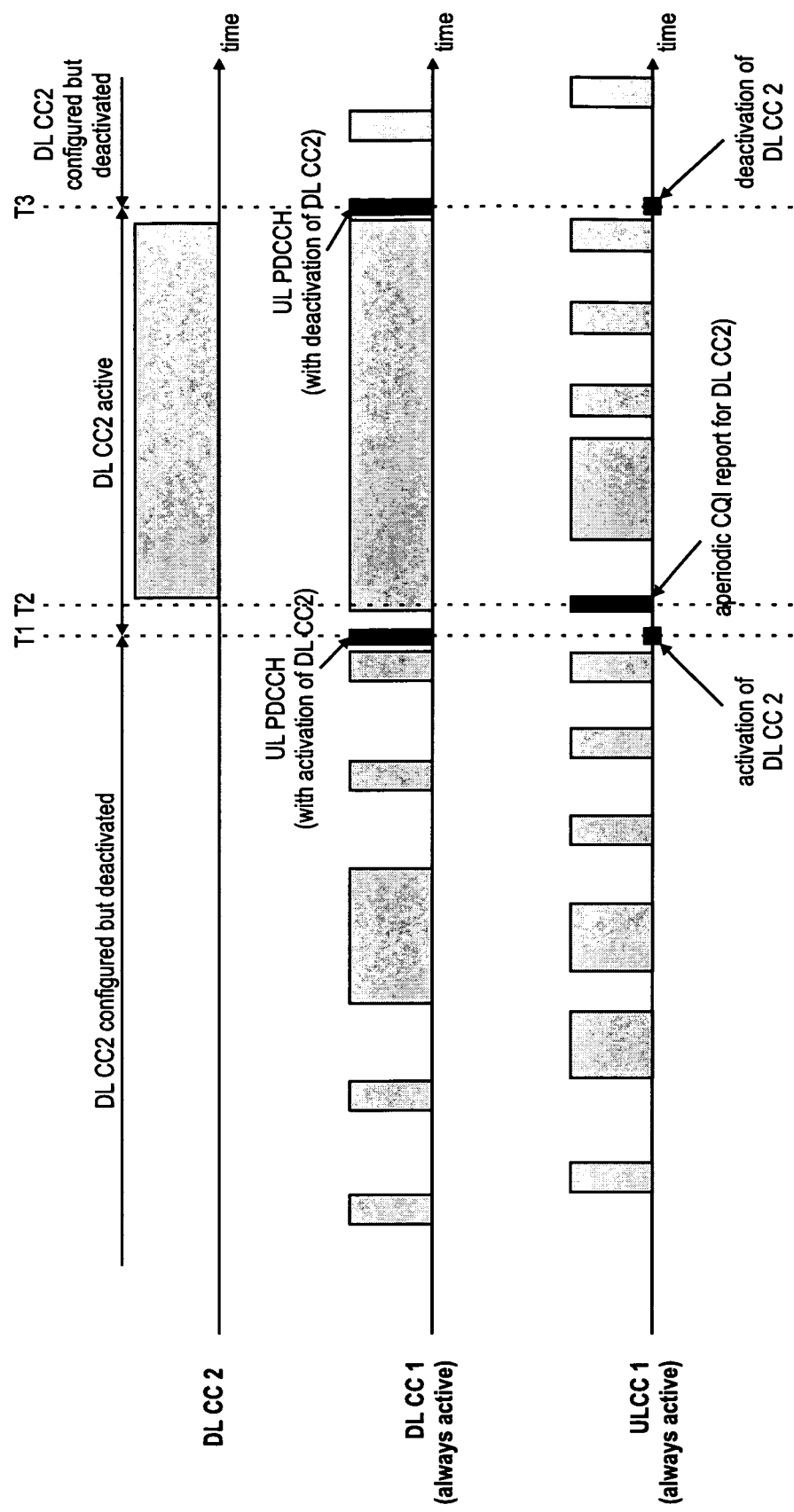

FIG. 15 exemplifies the procedure for the (de)activation of downlink component carriers in an exemplary 3GPP-based communication system according to an embodiment of the invention. It is exemplarily assumed that there are two downlink component carriers (DL CC1 and DL CC2) and one uplink component carrier (UL CC1) configured for carrier aggregation. First, DL CC2 is deactivated and only DL CC1 and UL CC1 are active (UL CC1 and DL CC1 are always active, since the user equipments needs to always have at least one active uplink and downlink component carrier in RRC connected mode).

At time T1, e.g. when DL traffic demand increases, the eNodeB activates DL CC2 for the user equipment by sending an uplink resource assignment (UL PDCCH) scrambled with CC-RNTI which initiates the activation of DL CC2. Upon reception of the uplink resource assignment at the user equipment, the user equipment activates DL CC2, e.g. start monitoring for corresponding PDCCH/PDSCH, and measures channel quality (CQI information) for DL CC2. The format of the CQI could be for example preconfigured by eNodeB, so that the user equipment is aware whether it should report a wide-band CQI or a frequency-selective CQI. The user equipment transmits at time T2 the calculated CQI information on the PUSCH resource assigned on the uplink (UL CC1) by the uplink resource assignment received at time T1. The CQI information is transmitted 4 ms after reception of the uplink resource assignment received at time T1, similar to the implementation foreseen in 3GPP LTE (Release 8/9).

After some number of sub-frames in which eNodeB transmitted downlink data on both activated downlink component carriers DL CC1 and DL CC2, the eNodeB decides to deactivate DL CC2. Accordingly, the eNodeB sends at time T3 another uplink resource assignment (UL PDCCH) scrambled with CC-RNTI and corresponding bit-mask that indicates the deactivation of DL CC2. Since CQI information for a deactivated downlink component carrier may not be useful, the eNodeB may sets the RBA field to all "1"s, in order to disable CQI transmission.

It should be also noted that since an the uplink resource assignments at times T1 and T3 are used for the activation, respectively deactivation of downlink component carrier DL CC2, the eNodeB can simultaneously (de)activate the downlink component carrier and transmit downlink data on the anchor carrier, i.e. DL CC1.

According to some embodiments discussed above, channel quality feedback has been provided by means of CQI information, i.e. aperiodic CQI, in the uplink on the PUSCH resources assigned by the uplink resource assignment activating downlink component carrier(s). In a further embodiment, in addition to the channel quality information reported for the newly activated downlink component carrier(s), the mobile terminal may optionally further transmit sounding reference signal(s) (SRS) on the uplink component carrier(s) which are linked to the activated downlink component carrier(s) and/or Power Headroom Report (PHR) information for the uplink component carrier(s) which are linked to the newly activated downlink component carrier(s). The PHR information is sent on the uplink resources assigned by the uplink resource assignment. The SRS and PHR information is for example useful for eNodeB in order to efficiently schedule PUSCH transmissions.

Therefore, according to this embodiment of the invention, the base station may also schedule PHR transmissions and/or SRS when activating downlink component carrier(s). Hence, instead of or in addition to reporting the channel quality of activated downlink component carriers on the uplink resources that have been assigned by the new proposed plink resource assignment, the mobile terminal may also signal scheduling related information to the base station such as SRS and/or PHR reports.

Figure 16:
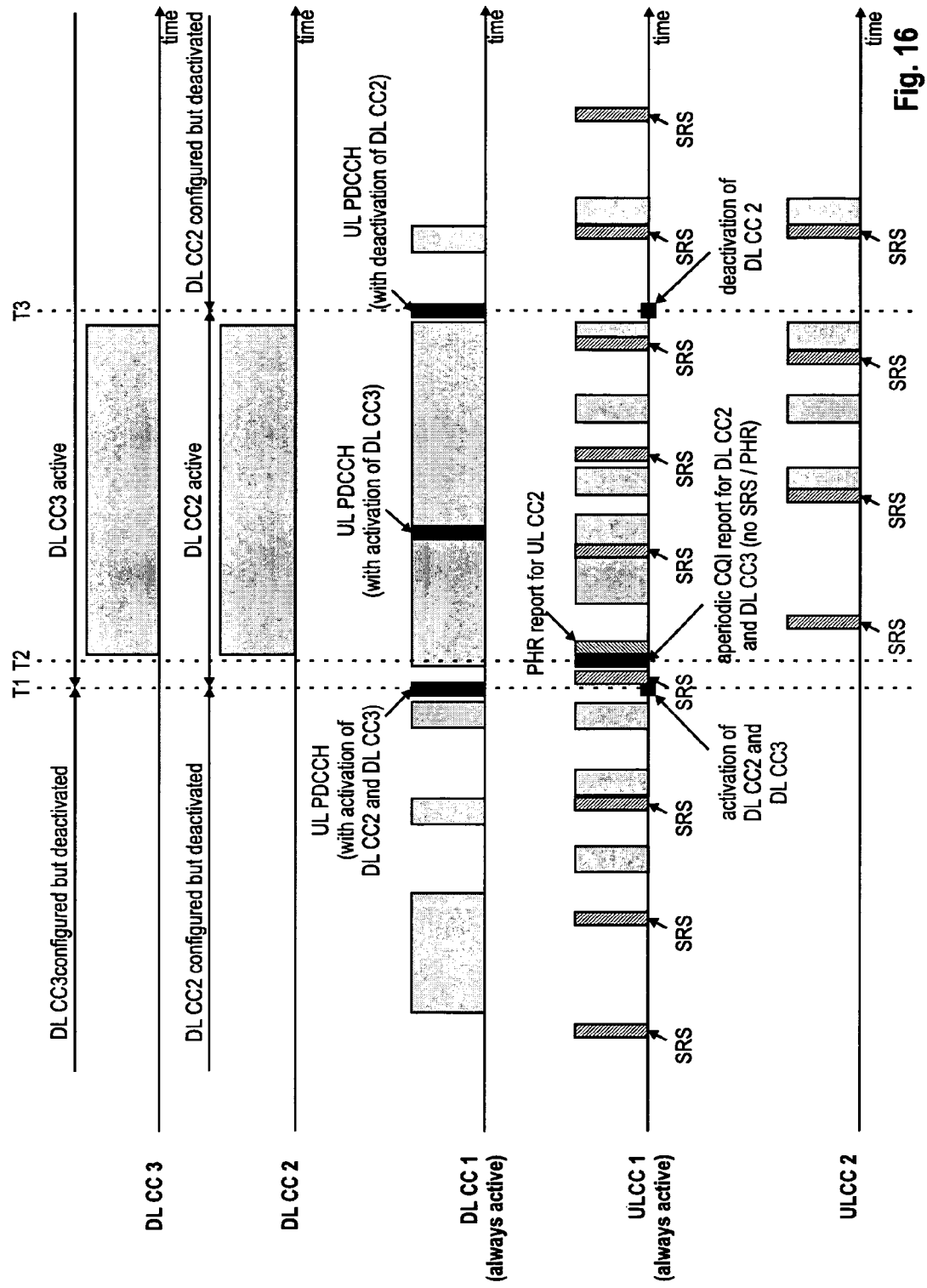

In the exemplary scenario shown in FIG. 16, the power headroom information for UL CC2 is transmitted on UL CC1. Since there is no uplink resource assignment on UL CC2 for the sub-frame in which the user equipment should calculate the power headroom for UL CC2, according to a further aspect and embodiment of the invention, the calculation of the power headroom for UL CC2 is redefined in comparison to 3GPP LTE (Release 8/9). In 3GPP LTE (Release 8/9) a power headroom report can only be sent in sub-frames where user equipment has an uplink assignment for transmission on the PUSCH (transport block), since the power headroom indicates the difference between the nominal user equipment's maximum transmit power and the estimated power for the assigned uplink transmission on the PUSCH. For the case there is no uplink assignment on an uplink component carrier for which a power headroom is to be reported, it is therefore proposed that the power headroom for the uplink component carrier which has no uplink resource assignment for the sub-frame in which power headroom should be determined is calculated by using a preconfigured reference uplink resource allocation. Essentially, the power headroom is then indicating in the difference between the nominal user equipment's maximum transmit power and the estimated power for the uplink transmission according to the preconfigured reference uplink resource allocation. The preconfigured reference uplink resource allocation may be for example signaled to the user equipment by radio resource control (RRC) signaling.

Detailed embodiments of the invention with regard to the calculation of a power headroom for uplink component carriers with no uplink assignment using a preconfigured reference uplink resource allocation will be explained later.

Similarly as for the channel quality reporting, also the transmission of SRS respectively PHR is not in all cases beneficial/required. Therefore similar to the embodiments described above, the base station may also enables/disables SRS and/or PHR reporting when activating or deactivating downlink component carrier(s). This could be achieved by similar mechanisms explained above for the suppression of channel quality feedback. Hence, including a special flag to the uplink resource assignment or defining special codepoints in the CIF field or RBA field of the uplink resource assignment could be used to indicate to the mobile terminal whether it is required to send SRS and/or PHR reports.

Alternatively, a predetermined rule could define whether SRS/PHR information should be transmitted. For example, the mobile terminal only sends SRS on the linked uplink component carrier and/or send PHR information for the linked uplink component carrier(s), in case the linked uplink component(s) are not yet active, i.e. no PUSCH/PUCCH transmissions were made by the mobile terminal on the linked uplink component carrier(s).

Figure 8:
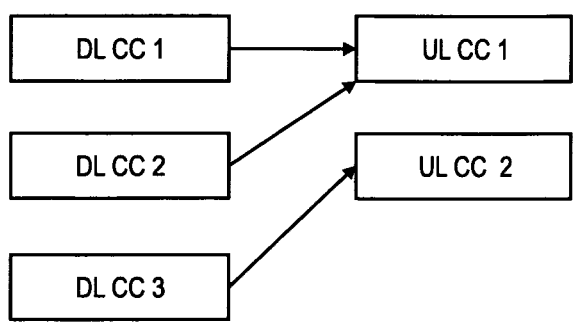

Considering the scenario shown in FIG. 8 as a configuration example of a user equipment, the transmission of SRS/PHR for the downlink component carrier activation case will be highlighted in the following with respect to FIG. 16. The assumption is that only DL CC1 and UL CC1 are currently activated and the eNodeB decides to also activate DL CC2 and DL CC3 at time T1. The eNodeB signals the proposed uplink resource assignment to the user equipment indicating to activate those DL CC2 and DL CC3. Furthermore the uplink resource assignment orders the user equipment to also send PHR information for the uplink component carrier(s) linked to the new activated downlink component carrier(s)—i.e. UL CC1 and UL CC2 in this example—and to transmit SRS on the linked uplink component carriers(s).

Upon the reception of the new proposed uplink resource assignment the user equipment's behavior according to one embodiment of the invention would be the following: The user equipment activates DL CC2 and DL CC3. Furthermore, the user equipment will measure CQI information on the two newly activated DL CCs and sends at time T2 the CQI reports for DL CC2 and DL CC3 on the uplink resources on UL CC1 assigned by the uplink resource assignment. Additionally, the user equipment will send power headroom information for UL CC2 on the assigned resources on UL CC1, as the activated DL CC3 is linked UL CC2. Moreover, user equipment will start transmitting SRS on UL CC2. This can be also referred to as an implicit activation/deactivation of an uplink component carrier, i.e. by means of activating/deactivating a downlink component carrier, the linked uplink component carrier is implicitly also activated respectively deactivated for periodic SRS transmissions and/or PHR transmissions and PUSCH transmissions. Hence by means of an activation/deactivation command for a DL component carrier respectively downlink SCell periodic SRS reporting can be enabled/disabled on the corresponding linked UL component carrier respectively UL SCell. The term "linked" refers to for example SIB2 linking between a downlink and uplink cell/component carrier or the scheduling relation between a downlink and uplink component carrier/cell.

According to a further embodiment of the invention, the configuration parameters for the SRS transmission are signaled to the user equipment via higher layer signaling, i.e. RRC signaling. For example when configuring the user equipment with the set of downlink and uplink component carrier(s) for carrier aggregation, the configuration message may also include the SRS configuration parameters for a specific uplink component carrier. Those configuration parameters may for example include the sub-frame configuration, i.e. set of sub-frames in which SRS may be transmitted within a radio frame, a periodicity and sounding bandwidth. Similarly also the configuration related to channel quality measurements on a downlink component carrier, i.e. transmission mode and reporting mode may be signaled within the component carrier configuration message.

Another embodiment of the invention relates to an improved deactivation mechanism for the downlink component carriers in a 3GPP-based communication system, e.g. 3GPP LTE-A (Release 10). As outlined above, it may not be always required/beneficial when user equipment reports CQI information in response to a deactivation of a component carrier. For example, for the deactivation case there doesn't seem to be a good motivation to send CQI information for a downlink component carrier which has just been deactivated. Therefore the uplink resource allocation related field in the uplink resource assignment, i.e. RBA field, MCS filed, UL hopping flag, and the DMRS field could be used for some other purpose.

When user equipment monitors the PDCCH, there is always a certain probability (false alarm rate) that the mobile terminal falsely detects a PDCCH: the CRC check of the PDCCH may be correct even though the PDCCH was not intended for this user equipment, i.e. CRC passes even though there is a RNTI mismatch (unintended user). This so called false alarm might happen, if the two effects of transmission errors caused by the radio channel and RNTI mismatch cancel each other. The probability of a falsely positive decoded PDCCH depends on the CRC length. The longer the CRC length, the lower the probability that a CRC-protected message is falsely correct decoded. With the CRC size of 16 bit the false alarm probability would be $1.5 \cdot 10^{-5}$.

In case a user equipment falsely detects a PDCCH with an uplink resource assignment indicating the deactivation of certain downlink component carrier(s) the user equipment would stop monitoring PDCCH/PDSCH for those indicated downlink component carrier(s) and also stops reporting CQI measurements. Given the severe consequences of such user equipment behavior, it is therefore desirable to decrease the false alarm probability. One mean to lower the false alarm rate to an acceptable level proposed in this embodiment is to use a "Virtual CRC" in order to expand the 16-bit CRC. That is, the length of CRC field can be virtually extended by setting fixed and known values to one or more of the DCI fields of the uplink resource assignment signaled on the PDCCH that are not useful for downlink component carrier deactivation, such as RBA field, MCS filed, UL hopping flag, and the DMRS field. The user equipments shall ignore the PDCCH comprising the uplink resource assignment for downlink carrier deactivation, if the values in these fields are not correct (i.e. are not corresponding to the known values). Since uplink resource allocation related DCI fields are essentially not required for the case of downlink component carrier deactivation, those fields could be used to extend the CRC virtually and thereby decreasing the false alarm probability. Similar mechanism for extending the CRC length virtually in order to further decrease the false alarm rate as described may be also applied for the DL component carrier activation case.

Another aspect of the invention is related to the HARQ protocol operation for the HARQ process used for transmitting the uplink resource assignment for (de)activation of downlink component carrier(s). It should be noted that this applies only to the case where there is a transmission (transport block) on the uplink shared channel (UL-SCH) scheduled by the uplink resource assignment indicating a downlink component carrier (de)activation, e.g. PHR information is scheduled for transmission on the uplink shared channel. Please note that this is in contrast to the transmission of an aperiodic Cal on the physical uplink shared channel (PUSCH), there is no transport block transmission involved, i.e. only physical layer transmission on PUSCH. Since the NDI which is usually used for HARQ process management, i.e. toggled NDI indicates initial transmission, may be reused in some implementations for indication of the activation state of the downlink component carrier(s), some new user equipment behavior may need to be defined for these implementations.

One approach according to an embodiment of the invention is that the user equipment ignores an uplink resource assignment indicating the (de)activation of downlink component carrier(s), when determining whether the NDI has been toggled compared to the value in the previous transmission.

Alternatively, in another embodiment of the invention, the user equipment sets the NDI value for the HARQ process used for transmitting the resource assignment indicating the (de)activation of downlink component carrier(s) to some predefined value, e.g. zero/one. As the eNodeB would be aware of this behavior, it could also set the NDI value in the HARQ status information accordingly to the predefined value for the HARQ process used for transmitting the resource assignment indicating the (de)activation of downlink component carrier(s). This allows for a correct HARQ process management for further initial/retransmission on this HARQ process.

For the above discussion it has been assumed that the (de)activation command for a downlink SCell is sent by physical layer signaling using PDCCH. However, MAC control signaling may be used alternatively to transmit the (de)activation command.

It should be also noted that the kind of (de)activation for the downlink SCell has no impact on the embodiments of the invention relating to the power headroom reporting for unscheduled uplink component carriers. In other words, the virtual power headroom calculation and reporting is independent from the kind of signaling which is used for activating or deactivating the component carriers, as long as the communication system uses component carrier aggregation.

Based on the particular regulation requirements (SEM, ACRL etc.), the value of the maximum power reduction depends for example on the number of allocated resource blocks and the channel bandwidth. For the continuous carrier aggregation with one power amplifier, the MPR value also depends on the distance between the allocated resource blocks on different component carriers.

Determining the MPR of a particular component carrier when multiple component carriers are scheduled for uplink transmission is a new issue in LTE Release 10. In release 8/9 there is only one component carrier and thus the MPR is calculated for each user equipment. There are basically two options on how to deal with the multiple component carriers with respect to MPR: either the impact of other component carriers are considered for a particular component carrier or each component carrier is considered stand-alone.

Figure 25:
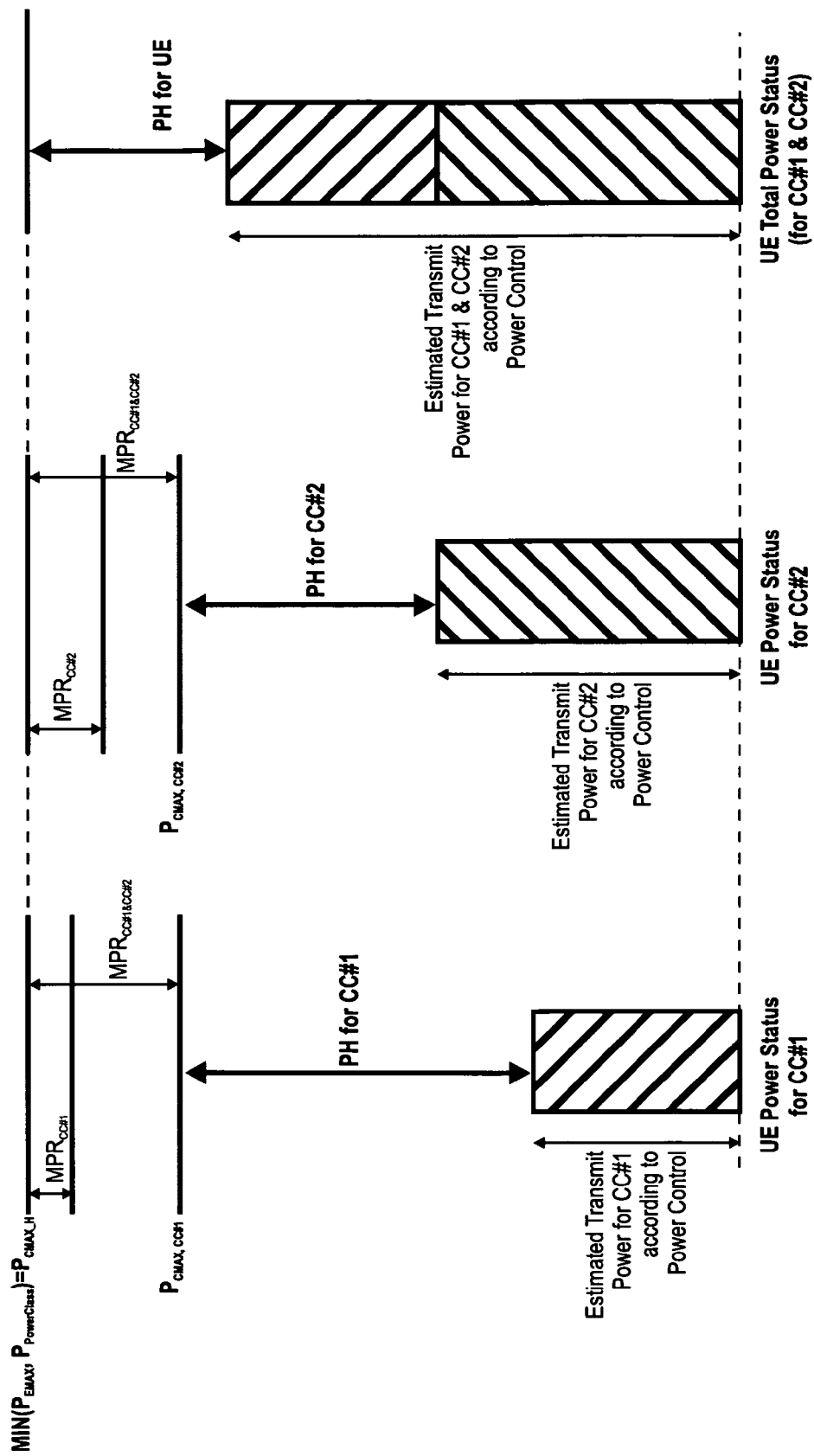
FIG. 25 shows an exemplary scenario in which the power reduction for a particular component carrier considers transmissions on other uplink component carriers, resulting in an $MPR_{CC\#1 \& CC\#2}$.

Approach 1: When considering the other component carriers, the MPR (MPR$_{CC\#1\&\#2}$) is applied to each component carrier specific maximum transmission power (P$_{cmax,c}$). The total maximum transmission power is the same maximum transmission power as the maximum power of the power class of the user equipment. FIG. 25 illustrates this approach, and will be explained in more detail. The maximum power reduction for both carriers when calculated separately (compare to FIG. 26) are denoted MPR$_{CC\#1}$ and MPR$_{CC\#2}$. The MPR, when considering other component carrier transmission, is larger and denoted MPR$_{CC\#1\&\#2}$. MPR$_{CC\#1\&\#2}$ is identical between different component carriers, and the value of M$_{CC\#1\&\#2}$ could be much larger compared with Rel-8 MPR requirements.

When using the MPR based on approach 1, the calculated power headroom may be more close to the actual remaining power. However, one concern is that this power headroom may not reflect a change of uplink scheduling accurately. For example, assuming two active carriers, a power headroom for component carrier 1 and component carrier 2 is reported. If after a few subframes only the first component carrier 1 is scheduled, i.e. no uplink transmission over component carrier 2, the eNB will use the "old" power headroom report for component carrier 1, until a new power headroom report is triggered. In said case however, the power headroom for component carrier 1 considers the uplink transmission on the second component carrier, which is actually no longer present. Therefore, the eNodeB is less likely to utilize the full potential of the increased power headroom of the user equipment for component carrier 1.

Figure 26:
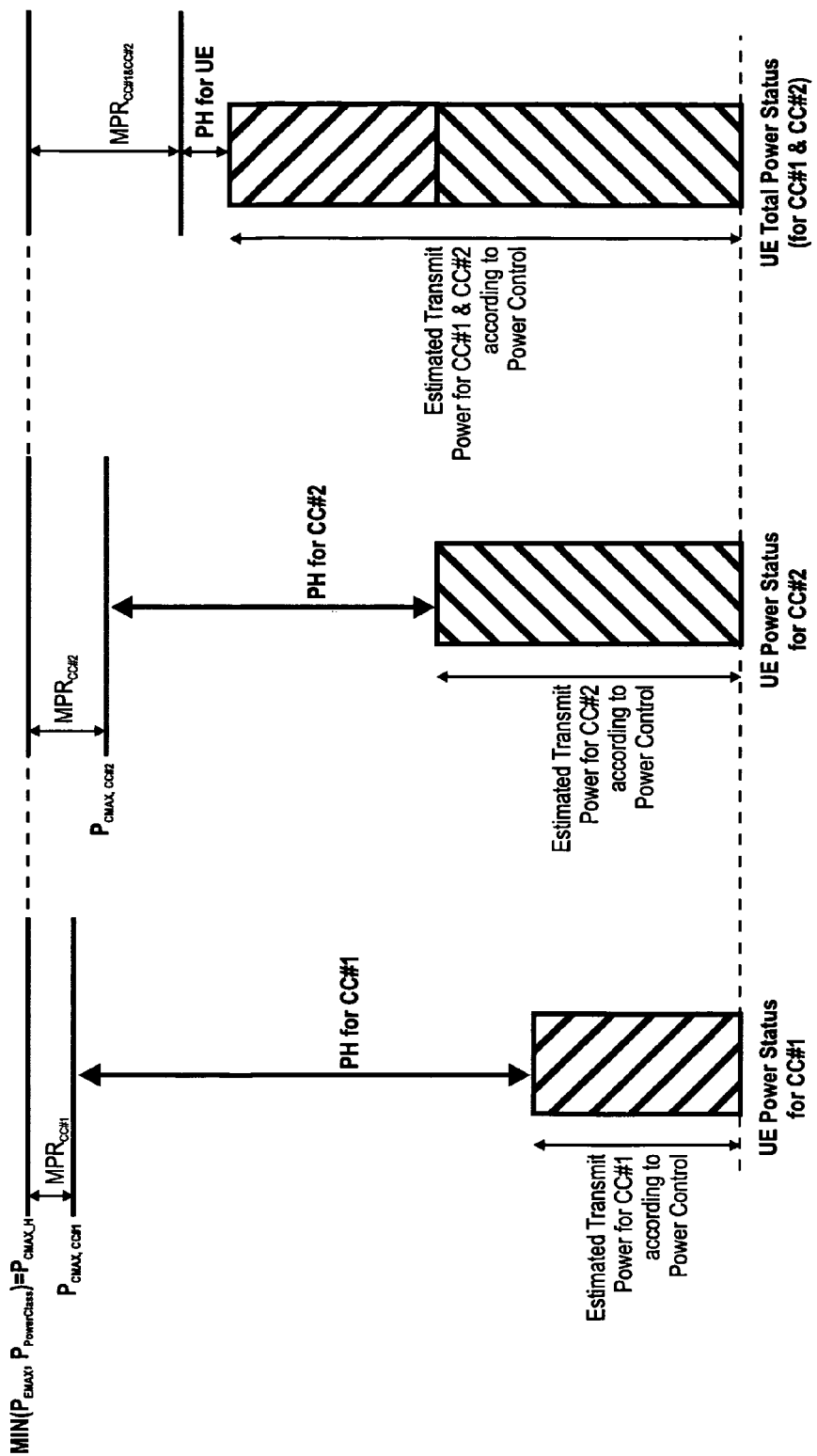
FIG. 26 shows an exemplary scenario in which the power reduction for a particular component carrier is calculated separately for each component carrier, resulting in different MPRs, $MPR_{CC\#1}$ and $MPR_{CC\#2}$.

Approach 2: When not considering the other component carriers, the MPR is separately calculated for each component carrier (MPR1, MPR2) and is applied to the component carrier specific maximum transmission power (P$_{cmax\_c}$). The MPR due to the multiple component carriers is then applied to the total maximum transmission power of the user equipment. FIG. 26 illustrates this approach and will be explained in more detail.

If the MPR is calculated separately for each component carrier, the LTE Release 8 requirements could be reused. Thus, each component carrier will have its own MPR value which could have a maximum value of up to 2 dB. As illustrated in FIG. 26, MPR$_{CC\#1}$ refers to the maximum power reduction for component carrier 1, and MPR$_{CC\#2}$ refers to the maximum power reduction for component carrier 2.

An advantage of approach 2, i.e. the MPR are calculated separately for each component carrier, is that the eNodeB can better understand the scheduling and power adjustment potential of each component carrier, because the power headroom would not be affected by the existence of other component carriers. For instance, if the allocated resource blocks of one component carrier are much less than the resource block allocation of the second component carrier, the first component carrier gets more room for the transmission power increase. Therefore, if the MPR of each component carrier is calculated separately, the eNodeB will easily learn the difference potential between the component carriers.

The following embodiments of the invention refer to power headroom reporting for uplink component carriers, which have no uplink resource assignment by the eNodeB. As already mentioned above, a proposal is set out below as to transmitting power headroom information for an uplink component carrier without having an uplink resource allocation/grant in the reference subframe of said unscheduled uplink component carrier.

Usually, in such cases no power headroom is possible for said component carriers, since according to 3GPP LTE rel. 8/9 a power headroom report can only be sent in subframes where the UE has an uplink resource assignment for transmission on the PUSCH. The power headroom indicates the difference between the user equipment's maximum transmit power and the estimated power for the assigned uplink transmission on the PUSCH. There is obviously no transmission format, such as allocated resource blocks or the modulation & coding scheme to be used. If there is not uplink transmission, no power headroom can be calculated and reported.

According to an embodiment of the invention, a pre-configured reference uplink resource allocation is used by the user equipment for calculating the power headroom of the non-scheduled uplink component carrier. Therefore, the power headroom is then essentially indicating the difference between the maximum transmit power of the non-scheduled uplink component carrier and the estimated power for the uplink transmission according to the pre-configured virtual uplink resource allocation.

The pre-configured reference uplink resource allocation in the user equipment is defined previously and is only used for the purpose of power headroom reporting, i.e. it is not used for actually transmitting data on the uplink component carrier. Therefore, in the following it may as well be called a pre-configured virtual uplink resource allocation. Since the power headroom does not refer to a real uplink transmission, it is called in the following virtual power headroom.

The eNodeB also has information on the pre-configured virtual uplink resource allocation, on which the user equipment bases the virtual power headroom calculation. The pre-configured virtual uplink resource allocation may be agreed upon between the user equipment and the eNodeB at the startup of the user equipment. It may be signaled to the user equipment for example by radio resource control (RRC) signaling. Alternatively, it may be fixed in the specification within the user equipment, making the RRC signaling unnecessary.

When being triggered to calculate and report the power headroom for the configured uplink component carriers, the user equipment also calculates the virtual power headroom for the un-scheduled uplink component carrier by using the pre-configured virtual uplink resource assignment. The virtual power headroom is then transmitted to the eNodeB along with the power headroom information for the scheduled uplink component carriers. In view of the missing uplink resource assignment for the other reference subframe of the unscheduled uplink component carrier for which the virtual power headroom is calculated, the virtual power headroom is transmitted on a different uplink component carrier. The virtual power headroom may be transported as a MAC control element.

By transmitting the virtual power headroom for non-scheduled uplink component carriers to the eNodeB, the eNodeB can learn important information on the power status of the user equipment and also on the power status of the unscheduled uplink component carrier. This allows the eNodeB to better schedule future uplink transmissions on said uplink component carrier. Without the virtual power headroom information, the eNodeB would need to roughly estimate the power situation of the uplink component carrier or blindly schedule the future uplink transmission on the un-scheduled uplink component carrier, once the eNodeB decides to schedule an uplink transmission over said uplink component carrier.

Based on the virtual power headroom the eNodeB is aware of the power situation on the non-scheduled uplink component carrier and can use this information for an increased scheduling efficiency.

More detailed embodiments will be explained below, wherein basically there are two alternatives on how to calculate the virtual power headroom. The particular way of how to calculate the virtual power headroom determines what exactly the eNodeB can learn from the received virtual power headroom.

According to a first alternative, the component carrier specific maximum transmission power $P_{cmax,c}$ is set to some pre-defined fixed value for the purpose of calculating the virtual power headroom for the non-scheduled uplink component carrier. The eNodeB shall know the pre-configured maximum transmission power $P_{cmax,c}$ used by the user equipment. $P_{cmax,c}$ may be set to any value, but is preferably set between the two limits $P_{cmax\_L}$ and $P_{cmax\_H}$.

The reference PUSCH format, i.e. the pre-configured virtual uplink resource allocation may be set according to the following example. The number of resource blocks is set to 1, which means that $10 \log_{10}(M_{PUSCH}(i))$ is zero dB. Furthermore, $\Delta TF$ is set to zero dB.

In case of the above exemplary pre-configured uplink resource allocation the formula for calculating the power headroom, which is $$PH(i) = P_{CMAX} - \{10 \cdot \log_{10}(M_{PUSCH}(i)) + P_{0\_PUSCH}(j) + \alpha(j) \cdot PL + \Delta_{TF}(i) + f(i)\}$$

can be reduced to the following:

$$vPH(i) = P_{CMAX\_preconf} - \{P_{0\_PUSCH}(j) + \alpha(j) \cdot PL + f(i)\}$$

The remaining parameters for calculating the virtual power headroom (vPH) are known to the user equipment. Values for the pathloss (PL), the received TPC commands (f(i)) and the other component carrier specific constants, such as $P_{O\_PUSCH}(i)$ or $\alpha$, are available for the non-scheduled uplink component carrier, even without an uplink data transmission. Using the pre-configured fixed value for $P_{cmax\_preconf}$, the user equipment is enabled to calculate the virtual power headroom for the non-scheduled uplink component carrier according to the above formula. The calculated virtual power headroom is then transmitted to the eNode, e.g. within a MAC control element over a scheduled uplink component carrier.

Above reference PUSCH format respectively the corresponding power control parameters have been considered only for the non-MIMO case. In case of uplink single user MIMO for example the reference PUSCH format respectively the corresponding power control parameters may be extended by some MIMO specific parameters. Those parameters may then be pre-configured in the same way as for the non-MIMO case.

Based on the eNodeB knowledge of $P_{cmax\_preconfig}$, it is able to retrieve some information on the PL, i.e. the pathloss measured by the user equipment for this unscheduled uplink component carrier. Therefore, the virtual power headroom unveils some information on the pathloss situation of the corresponding uplink component carrier, which can be used by the eNodeB for a more efficient radio resource management. For instance, the eNodeB can detect a large pathloss difference among aggregated component carriers. Large pathloss differences should be avoided, and the eNodeB should aggregate component carriers which have similar pathloss characteristics from the point of view of the user equipment.

It should be noted that the pathloss situation usually changes only slowly depending on the velocity of the user equipment; so the pathloss value calculated based on the virtual power headroom can remain valid for quite some time, and the eNodeB can assume the basically same pathloss situation for future uplink transmission scheduling.

The eNodeB may also calculate the power per resource block $(P_{O\_PUSCH}(j) + \alpha(j) \cdot PL + f(i))$ for the corresponding uplink component carrier, thus allowing the eNodeB to efficiently schedule uplink transmissions in future on that uplink component carrier, which is currently not scheduled. For instance, the eNodeB can use this information in order to decide whether to schedule an uplink transmission on this component carrier or not. In case the power spectrum density has a value which is too high, the eNodeB will refrain from scheduling this component carrier, since there is a risk that the user equipment will become power limited. In the same way, the eNodeB is able to detect large PSD differences among aggregated component carriers. In case of large PSD differences among component carriers, it is either impossible to transmit on multiple component carriers simultaneously by the user equipment, or it increases the complexity of the user equipment significantly, since it impacts on the dynamic range of the power amplifier.

As already mentioned, for the first alternative the configured maximum transmit power of the user equipment of the user equipment for the unscheduled uplink component carrier may be set to a fixed pre-configured value. For example, it may be set to $P_{cmax\_H}$, which is $P_{CMAX\_H}=\min(P_{EMAX}, P_{PowerClass})$. Since $P_{EMAX}$ is a value signaled by the network, and $P_{PowerClass}$ is also known by the network, eNodeB is aware of $P_{cmax\_H}$. Setting $P_{cmax}$ to $P_{cmax\_H}$ means that there is no power reduction due to MPR/A-MPR considered for the corresponding non-scheduled uplink component carrier which seems reasonable since the power for number of resource blocks is set to zero according to the exemplary reference PUSCH format.

Alternatively, $P_{cmax}$ can be set to $P_{cmax\_L}$, which is $$P_{CMAX\_L}=\min(P_{EMAX}-\Delta T_C, P_{PowerClass}-MPR-AMPR-\Delta T_C)$$

The maximum power reduction of the user equipment is not known by the eNode, but is selected by the user equipment based on the transmission format according to Table 1 in the background section for user equipments in power class 3. For instance, the eNodeB can only determine that the maximum power reduction which the user equipment may apply at a maximum must be below 1 dB. Therefore, the eNodeB does not know what value the maximum power reduction for a particular user equipment is. The actual power reduction then used by the user equipment may be smaller than the maximum power reduction configured by the user equipment.

However, the eNodeB is usually unaware of the maximum power reduction that the user equipment may apply for a particular uplink transmission. In order that the eNodeB still knows about the maximum power reduction of the eNodeB, it can be defined that, when calculating a virtual power headroom and using $P_{cmax\_L}$ as the preconfigured $P_{cmax\_preconfig}$, the user equipment uses the largest possible, i.e. most conservative, MPR value defined in the specification (e.g. Table 1 of background section). By agreeing on how to calculate $P_{cmax\_L}$ it is possible that the eNodeB knows the $P_{cmax\_preconfig}$ used by the user equipment in calculating the virtual power headroom, and can thus infer the pathloss/power-per-resource-block as explained above.

In general, the virtual power headroom definition according to this first alternative embodiment is particularly beneficial though not limited to the MPR calculation where the MPR is calculated separately for each uplink component carrier (see approach 2 above in connection with FIG. 26). More specifically, the eNB can roughly estimate the power per resource block for a scheduled uplink component carrier, based on a received corresponding power headroom report for said scheduled uplink component carrier. Even though the eNodeB is not aware of the exact used component carrier specific maximum transmission power $P_{cmax\_c}$, the used power reduction can be roughly estimated by the eNodeB from the MPR requirements as to the modulation order, resource allocation etc, from the specification, as exemplified in Table 1 for user equipment of power class 3. Advantageously, the eNodeB could for example always assume the most conservative (largest) MPR value to determine $P_{cmax\_c}$ for scheduled uplink component carriers. Based on the received virtual and normal power headroom reports, the eNodeB can hence estimate the total power status of the user equipment for future transmissions.

According to a further alternative solution different from the above one, the virtual PUSCH power is set to zero dB and $P_{cmax}$ is calculated by the user equipment as usual for any other component carrier.

In accordance therewith, the virtual power headroom is calculated with the following formula:

$$vPH(i)=P_{CMAX}-\{0\}$$

All parameters which relate to the uplink transmission are set to zero dB. This means that it is assumed that there is no transmission, pathloss or power commands influencing the virtual power headroom for this unscheduled uplink component carrier. The virtual power headroom essentially reports the component carrier specific maximum transmit power for the non-scheduled uplink component carrier of the user equipment.

As already mentioned, the $P_{cmax}$ is calculated by the user equipment according to normal procedure, i.e. same as for a scheduled uplink component carrier. Accordingly, the power reduction of the user equipment is considered for the virtual power headroom in the same way as for normal power headroom reporting of other component carrier having uplink grants.

The second alternative is particularly advantageous when the MPR calculation considers uplink transmissions on other uplink component carriers (see approach 1, FIG. 25), though it is not limited thereto as will become apparent. In said case, the second alternative not only allows the eNodeB to learn the power reduction of the unscheduled uplink component carrier for which the virtual power headroom is actually transmitted, but the eNodeB may thus also learn the power reduction of the remaining scheduled uplink component carriers. According to approach 1, the power reduction ($MPR_{CC\#1\&CC\#2}$) is the same for all component carriers. Therefore, the power reduction that the eNodeB determines from the virtual power headroom received for the unscheduled uplink component carrier, is also the same power reduction that the user equipment applies to uplink transmissions on the other scheduled uplink component carriers.

Based on the reported virtual power headroom, and the thus acquired power reduction value, the eNodeB can calculate the absolute transmission power, respectively Power per resource block, for the other scheduled uplink component carriers. It may thus calculate the total transmission power status of the UE accurately, which allows for accurate scheduling of future uplink transmissions.

This particular advantage is not possible for approach 2 of the MPR calculation, since the MPRs are then calculated separately for each component carrier, thus also having different MPR values for each component carrier.

According to another embodiment of the invention, the above presented two alternatives for reporting power headroom of non-scheduled uplink component carriers, can be combined. In more detail, the user equipment may be able to calculate the virtual power headroom according to both alternative embodiments, and would select one alternative depending on the scenario. For instance, when in the communications system the MPR values are usually calculated considering the uplink transmissions on other uplink component carriers (see approach 1, FIG. 25), the user equipment may preferably use the second alternative, where the PUSCH uplink transmit power is set to zero and $P_{cmax\_c}$ is calculated considering the power reduction applied by the user equipment. The eNodeB would know which alternative is selected by the user equipment for calculating the virtual power headroom, in order to correctly interpret the virtual power headroom value received from the user equipment.

Conversely, the user equipment may calculate the virtual power headroom using a pre-configured $P_{cmax\_c}$ (e.g. $P_{cmax\_H}$) and a pre-configured uplink resource assignment, when in the communications system the MPR is calculated separately for each component carrier. Alternatively the user equipment might be configured by eNodeB for using one or the other method for virtual power headroom calculation. This configuration may be for example signaled by means of higher layer signaling, such as RRC.

In the following other aspects relating to the above two alternative solutions on how to calculate a virtual power headroom, will be discussed below.

For many scenarios, it is advantageous that an eNodeB may distinguish between a normal PHR and a virtual PHR according to the embodiments of the invention. For instance, in case a PDCCH (uplink resource assignment) is lost, the corresponding uplink component carrier would remain unscheduled from the perspective of the user equipment, but scheduled from the perspective of the eNodeB. Accordingly, when triggered, the user equipment would calculate a virtual power headroom for the corresponding unscheduled uplink component carrier according to one of the two alternatives discussed above, while the eNodeB would expect a power headroom calculated as defined by the standard specification in accordance with the uplink resource assignment it previously transmitted to the user equipment. In said case, the eNodeB would misinterpret the received power headroom value, which might have a negative influence on the determination of the power situation of the user equipment and would thus lead to inefficient scheduling.

Figure 27:
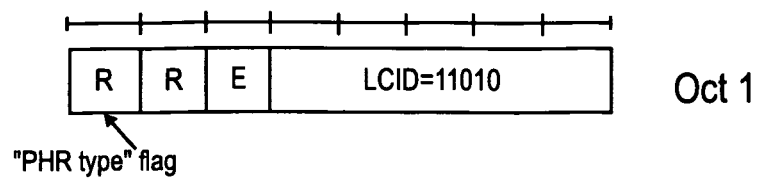
FIG. 27 shows a format of a MAC subheader for the MAC control element comprising the power headroom, the MAC subheader including a "PHR type flag" for distinguishing between normal power headrooms and the virtual power headrooms according to the present invention.

In order to avoid this and similar situations, virtual power headroom reports may be marked accordingly to distinguish same from normal power headroom reports. A one-bit flag may be used in said respect. For instance, as depicted in FIG. 27, one of the two reserved bits in the MAC PDU subheader corresponding to the power headroom MAC control element may be used. As can be seen, the LCID=11010 identifies a power headroom, and the "PHR type" flag indicates whether the power headroom represents a "virtual" power headroom, i.e. for a non-scheduled uplink component carrier, or not.

Figure 22:
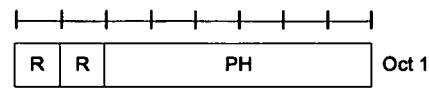
FIG. 22 shows the format of a MAC control element for reporting a power headroom for a component carrier.
Figure 23:
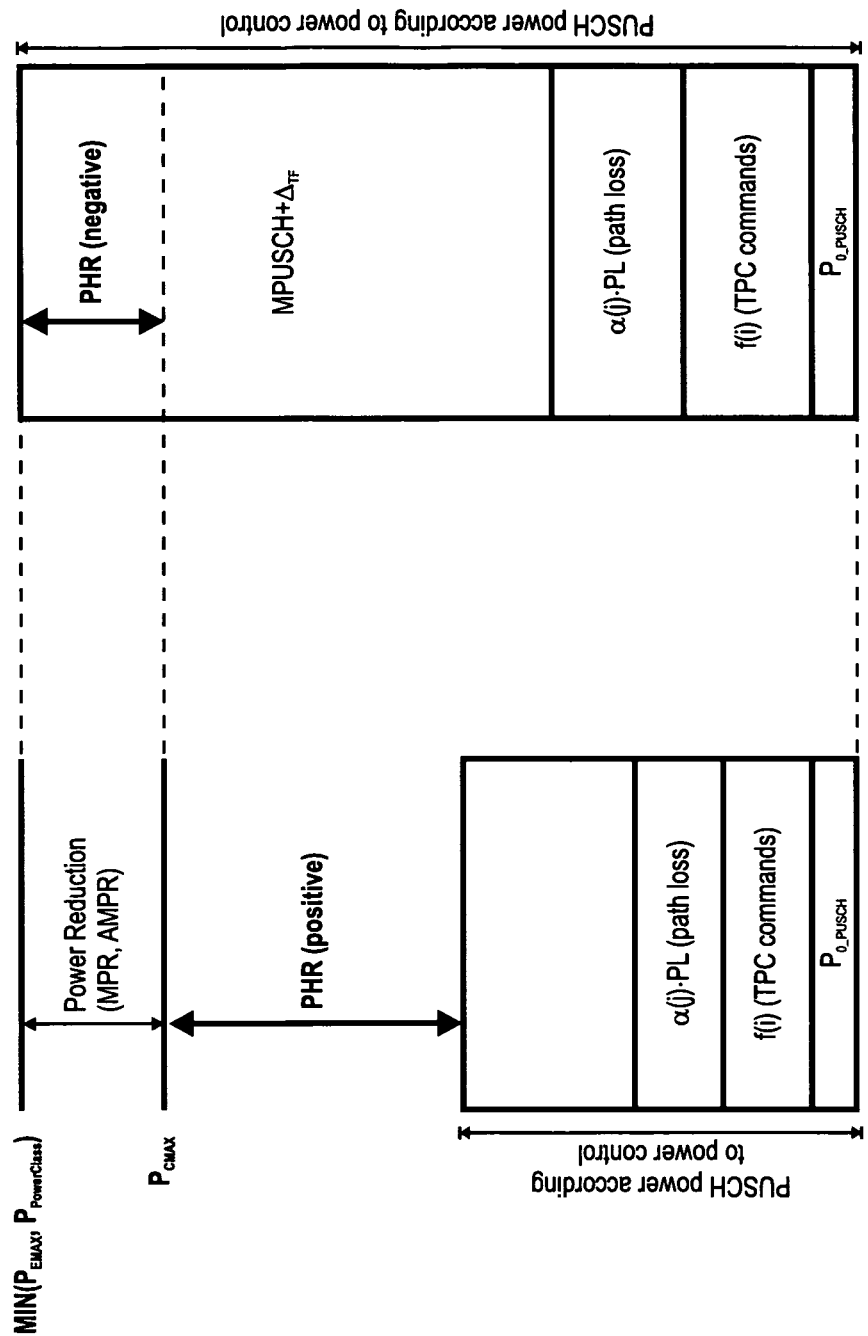
FIG. 23 shows an exemplary scenario for a UE transmission power status and the corresponding power headroom, resulting in positive and negative power headrooms.
Figure 24:
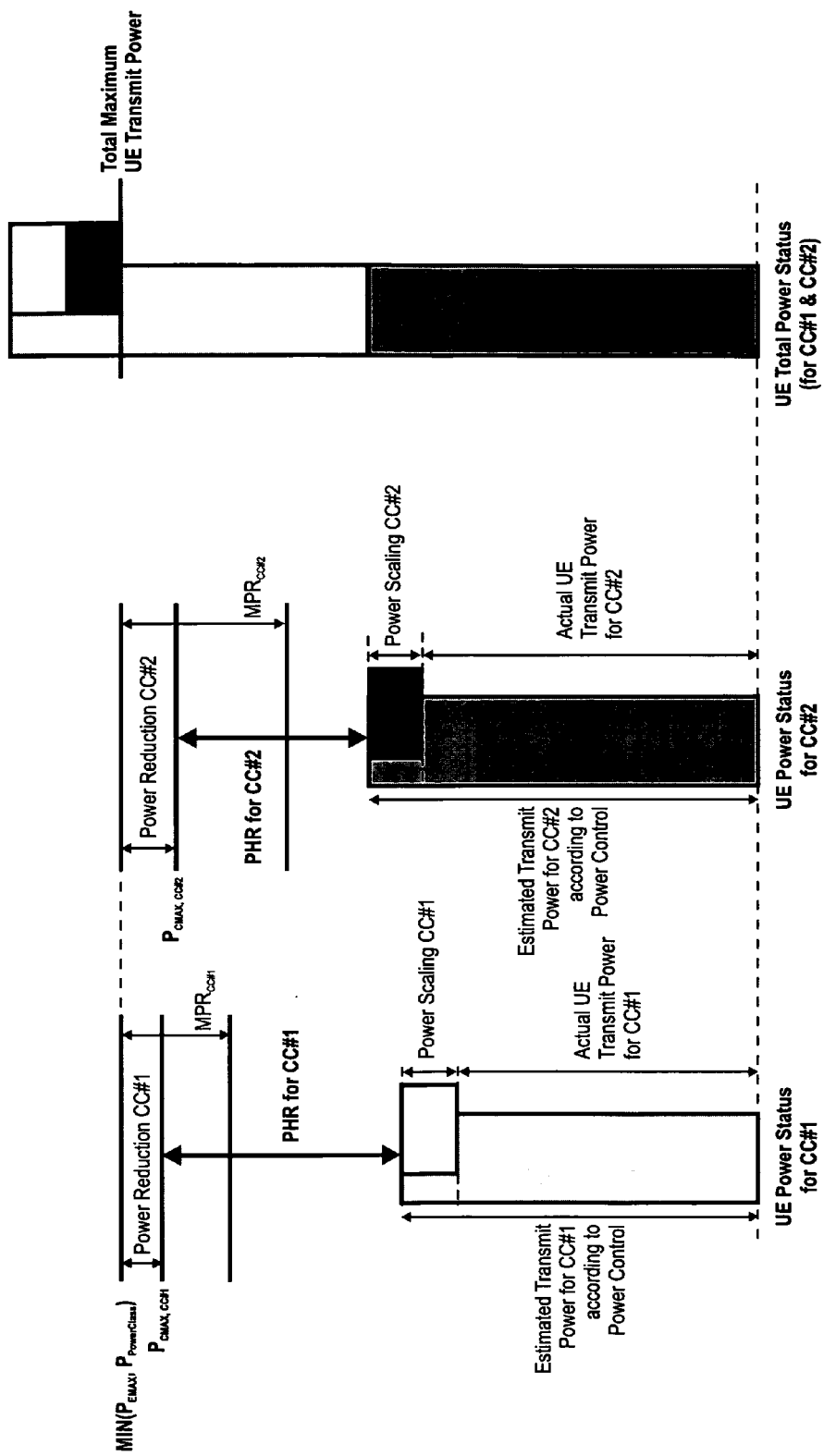
FIG. 24 shows an exemplary scenario where a user equipment is power limited, i.e. is applying power scaling on component carriers CC#1 and CC#2 configured in the uplink.

Alternatively, one of the reserved bits in the MAC control element (see FIG. 22) for the power headroom may be used to identify the type of power headroom.

As already explained the range which the power headroom can report is limited to 6 bit according to Rel. 8/9 specification, and in particular to the values +40 to −23 dB. Since the virtual power headroom report on uplink component carriers where no transmission is actually effected, it might happen that the virtual power headroom exceeds the range defined. For example, a virtual power headroom calculated according to the first alternative might frequently exceed the upper limit, i.e. 40 dB for user equipments with small path-loss. Therefore, using the above-indicated range for the power headroom (40-23 dB), the virtual power headroom may not be indicated correctly.

In order to solve this problem, the positive range could be extended by redefining the negative values, since a virtual power headroom can never be negative. In said case, the range for a virtual power headroom could be defined to be from 64 dB to 0 dB.

Alternatively, some offset value can be considered when calculating the virtual power headroom, such that virtual power headroom values outside the range would be offset to be within the possible range. In detail, a calculated virtual power headroom value of 50 dB would be outside the Rel. 8/9 range of 40 dB to −23 dB. By using an offset value for the calculation of the virtual power headroom of e.g. using an offset of 20 dB, the reported virtual power headroom value could be represented by the 6-bit range. The offset value may already be added to the PUSCH power used in the calculation of the virtual power headroom. In any case, the used offset value and how to apply it should be known by the eNodeB, so it may correctly calculate the real virtual power headroom value from the received virtual power headroom value.

For the case of the second alternative for the virtual power headroom calculation, i.e. virtual power headroom reports the maximum transmission power for the component carrier, the range needs to be also redefined compared to Rel. 8/9 specification. Because of vPH being $vPH(i)=P_{CMAX}-\{0\}$, vPH is in dBm and not dB as for the normal power headroom report, the values should be changed. Also the range is different, i.e. it should be from 23 dBm to 20 dBm for example with finer granularity regarding the available 6 bit.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for a user equipment reporting to an eNodeB a power headroom in a mobile communication system using component carrier aggregation, wherein the method comprises the steps of:

calculating by the user equipment one or both of a normal power headroom for a scheduled uplink component carrier and a virtual power headroom for a non-scheduled uplink component carrier, the virtual power headroom being calculated based on a pre-configured virtual uplink resource assignment for said non-scheduled uplink component carrier, transmitting by the user equipment to the eNodeB a report including, one of the normal power headroom and the virtual power headroom, and a flag indicating which one of the normal power headroom and the virtual power headroom is included in the report, receiving by the user equipment from the eNodeB uplink power control information, and controlling by the user equipment uplink power based on the received power control information.

2. The method according to claim 1, wherein the virtual power headroom is a difference between a pre-configured maximum transmit power for the non-scheduled uplink component carrier of the user equipment and a virtual transmit power for the non-scheduled uplink component carrier calculated based on the pre-configured virtual uplink resource assignment.

3. The method according to claim 2, wherein the eNodeB has information on the pre-configured virtual uplink resource assignment and on the pre-configured maximum transmit power for the non-scheduled uplink component carrier of the user equipment, the method further comprising the step of:
   determining by the eNodeB a path-loss and/or power-per-resource-block for the non-scheduled uplink component carrier based on the received virtual power headroom, the pre-configured virtual uplink resource assignment and the pre-configured maximum transmit power for the non-schedule uplink component carrier.

4. The method according to claim 2, wherein the pre-configured maximum transmit power for the non-scheduled uplink component carrier is set to a highest maximum transmit power for an uplink component carrier of the user equipment, the highest maximum transmit power being calculated without considering a power reduction to be applied by the user equipment to control adjacent channel leakage power.

5. The method according to claim 2, wherein the pre-configured maximum transmit power for the non-scheduled uplink component carrier is set to a lowest maximum transmit power, the lowest maximum transmit power being calculated considering a power reduction to be applied by the user equipment to control adjacent channel leakage power.

6. The method according to claim 2, wherein the virtual power headroom is equal to the maximum transmit power configured by the user equipment for the non-scheduled uplink component carrier.

7. The method according to claim 6, wherein in the communication system the calculation of a power reduction for each uplink component carrier considers transmission(s) on other configured uplink component carrier(s) of the user equipment, the method comprising the steps of:
   determining by the user equipment a power reduction (MPR) for the non-scheduled uplink component carrier, which considers transmission(s) on other configured uplink component carrier(s) of the user equipment,
   calculating by the user equipment the maximum transmit power based on the determined power reduction (MPR), and
   calculating by the eNodeB the power reduction used by the user equipment for all of its uplink component carriers, based on the received virtual power headroom.

8. The method according to claim 1, wherein
   the report is transmitted in a form of a MAC (medium access control) control element, or
   the MAC protocol data unit.

9. A user equipment for reporting to an eNodeB a power headroom in a mobile communication system using component carrier aggregation, wherein the user equipment comprises:
   a processor adapted to calculate one or both of a normal power headroom for a scheduled uplink component carrier and a virtual power headroom for a non-scheduled uplink component carrier, the virtual power headroom being calculated based on a pre-configured virtual uplink resource assignment for said non-scheduled uplink component carrier,
   a transmitter adapted to transmit to the eNodeB a report including, one of the normal power headroom and the virtual power headroom, and a flag indicating which one of the normal power headroom and the virtual power headroom is included in the report,
   a receiver adapted to receive from the eNodeB uplink power control information,
   wherein the processor is further adapted to control uplink power based on the received power control information.

10. The user equipment according to claim 9, wherein the virtual power headroom is a difference between a pre-configured maximum transmit power for the non-scheduled uplink component carrier of the user equipment and a virtual transmit power for the non-scheduled uplink component carrier calculated based on the pre-configured virtual uplink resource assignment.

11. The user equipment according to claim 10, wherein the pre-configured maximum transmit power for the non-scheduled uplink component carrier is set to a highest maximum transmit power for an uplink component carrier of the user equipment, the highest maximum transmit power being calculated without considering a power reduction to be applied by the user equipment to control adjacent channel leakage power.

12. The user equipment according to claim 10, wherein the pre-configured maximum transmit power is set to a lowest maximum transmit power, the lowest maximum transmit power being calculated considering a power reduction to be applied by the user equipment to control adjacent channel leakage power.

13. The user equipment according to claim 10, wherein the processor is further adapted to calculate the virtual power headroom equal to the maximum transmit power configured by the user equipment for the non-scheduled uplink component carrier.

14. The user equipment according to claim 9, wherein the processor is adapted to ignore the pre-configured virtual uplink resource assignment for performing an uplink transmission on the non-scheduled uplink component carrier.

15. The user equipment according to claim 9, wherein the transmitter is adapted to transmit the report of the power headroom to the eNodeB using an uplink component carrier having an uplink resource assignment scheduled by the eNodeB.

16. The method according to claim 2, wherein the report of the power headroom is transmitted to the eNodeB using an uplink component carrier having an uplink resource assignment scheduled by the eNodeB.

17. An integrated circuit for reporting to an eNodeB a power headroom in a mobile communication system using component carrier aggregation, the integrated circuit comprising:
   communication control circuitry which, in operation, calculates one or both of a normal power headroom for a scheduled uplink component carrier and a virtual power headroom for a non-scheduled uplink component carrier, the virtual power headroom being calculated based on a pre-configured virtual uplink resource assignment for said non-scheduled uplink component carrier,
   one or more output nodes which, in operation, output, for transmission to the eNodeB, a report including, one of the normal power headroom and the virtual power headroom, and a flag indicating which one of the normal power headroom and the virtual power headroom is included in the report, and
   one or more input nodes which, in operation, input uplink power control information received from the eNodeB, wherein the communication control circuitry, in operation, controls uplink power based on the received power control information.

18. The method according to claim 1, wherein, in the pre-configured virtual uplink resource assignment for the non-scheduled uplink component carrier, a number of resource blocks to be used for transmitting the non-scheduled uplink component carrier is set to 1.

19. The user equipment according to claim 9, wherein, in the pre-configured virtual uplink resource assignment for the non-scheduled uplink component carrier, a number of resource blocks to be used for transmitting the non-scheduled uplink component carrier is set to 1.

20. The integrated circuit according to claim 17, wherein in the pre-configured virtual uplink resource assignment for the non-scheduled uplink component carrier, a number of resource blocks to be used for transmitting the non-scheduled uplink component carrier is set to 1.

* * * * *